United States Patent

Kawabe et al.

[11] Patent Number: 6,041,177
[45] Date of Patent: Mar. 21, 2000

[54] PROGRAM ANALYZING APPARATUS WHICH CATEGORIZES VARIABLES INTO DOMAINS AND METHOD THEREOF

[75] Inventors: Keiko Kawabe; Akihiko Matsuo; Minako Kimura; Kenji Nagahashi; Sanya Uehara, all of Kawasaki, Japan

[73] Assignee: Fujitsu Limited, Kawasaki, Japan

[21] Appl. No.: 08/928,501

[22] Filed: Sep. 12, 1997

[30] Foreign Application Priority Data

Feb. 26, 1997 [JP] Japan ................................. 9-042190

[51] Int. Cl.[7] ........................................................ G06F 9/45
[52] U.S. Cl. ............................ 395/704; 395/705; 714/38
[58] Field of Search .................................. 395/703, 704, 395/705, 708; 707/101; 714/38

[56] References Cited

U.S. PATENT DOCUMENTS

| | | | |
|---|---|---|---|
| 5,655,073 | 8/1997 | Nishikado et al. | 714/38 |
| 5,742,827 | 4/1998 | Ohkubo et al. | 395/701 |
| 5,794,048 | 8/1998 | Brady | 395/705 |
| 5,808,889 | 9/1998 | Burgess | 364/737 |
| 5,828,890 | 10/1998 | Rehbock et al. | 710/260 |
| 5,854,924 | 12/1998 | Rickel et al. | 395/704 |

OTHER PUBLICATIONS

Kawabe, K.; Matsuo, A.; Uehara, S.; Ogawa, A.; "Variable Classification Technique for Software Maintenance and Application to the Year 2000 Problem"; Proceedings of the Second Euromicro Conference on Software Maintenance and Reengineering; pp. 44–50, Mar. 1998.

Matsuo, A.; Uehara, S.; Kimura, M.; "A Maintenance Support System Based on High–Level Control Flow and Data Dependnecy"; Proceedings of the Dec. 1995 Asia Pacific Software Engineering Conference; pp. 390–398.

Joiner, J.; Tsai, W.; Chen, X.; Subramanian, S.; Sun, J.; Gandamaneni, H.; "Data–Centered Program Understanding"; Proceedings of the International Conference on Software Maintenance; pp. 272–281, Sep. 1994.

Hart, J.; Pizzarello, A.; "A Scaleable, Automated Process for Year 2000 System Correction"; Proceedings of the 18th International Conference on Software Engineering; pp. 475–484, 1996.

Chen, X.; Tsai, W.; Joiner, J.; Gandamaneni, H.; Sun, J.; "Automatic Variable Classification for COBOL Programs"; Proceedings of the Eighteenth Annual International Computer Software and Applications Conference; pp. 432–437, Nov. 1994.

*Primary Examiner*—Eric W. Stamber
*Assistant Examiner*—Brian Sattizahn
*Attorney, Agent, or Firm*—Staas & Halsey, LLP

[57] ABSTRACT

A variable type analyzing unit detects the data types of each variable. A variable length analyzing unit detects the length of each variable. A partial reference unit detects the range of a partial reference when part of a variable is referred to. An internal layout analyzing unit checks the range to which data is actually referred and to which data is actually assigned based on the information on each variable obtained by the above units. A domain analyzing unit categorizes variables used in a target program by domain based on the ranges.

12 Claims, 24 Drawing Sheets

```
DATA DIVISION.
  01    ORDERED DATE.
          02  ORDERED YEAR      PIC9(4).
          02  ORDERED MONTH     PIC9(2).
          02  ORDERED DAY       PIC9(2).
  01    DELIVERED DATE
          02  DELIVERED YEAR    PIC9(4).
          02  DELIVERED MONTH   PIC9(2).
          02  DELIVERED DAY     PIC9(2).
```

FIG. 1A    PRIOR ART

| DATA NAME | TYPE | SIZE |
|---|---|---|
| ORDERED DATE. |  | 8 |
| ORDERED YEAR | NUMERIC | 4 |
| ORDERED MONTH | NUMERIC | 2 |
| ORDERED DAY | NUMERIC | 2 |
| DELIVERED DATE |  | 8 |
| DELIVERED YEAR | NUMERIC | 4 |
| DELIVERED MONTH | NUMERIC | 2 |
| DELIVERED DAY | NUMERIC | 2 |

FIG. 1B    PRIOR ART

```
   ⋮
MOVE A TO B.            ⇨   [ A, B ]
   ⋮
IF ( X > Y)             ⇨   [ A, B ] [ X, Y ]
   ADD B TO C           ⇨   [ A, B, C ] [ X, Y ]
ELSE
   ADD B TO D           ⇨   [ A, B, C, D ] [ X, Y ]
END-IF.
F ( X > Z)              ⇨   [ A, B, C, D ] [ X, Y, Z ]
   ⋮
```

SYMBOLS INSIDE [ ] SHOW THAT THEY BELONG TO THE SAME DOMAIN

FIG. 4

```
01 A.
  02 A1 PIC X(2).
  02 A2 PIC X(2).
  02 A2 PIC X(2).
01 B PIC N(1).
MOVE A TO B.
```

CORRECT DOMAIN RELATION

SAME DOMAIN RELATION OBTAINED BY THE RELATED INVENTION

A : MULTIPLE ITEM (GROUP)
    6 DIGITS (6 BYTES)
B : JAPANESE CHARACTER
    1 DIGIT (2 BYTES)

A  : ORDERED DATE
A1 : YEAR
A2 : MONTH
A3 : DAY
B  : ORDERED YEAR

```
01 REC X(100).
01 ORDER-FILE.
     ⋮
01 STOCK-FILE.
     ⋮
MOVE ORDER-FILE
     TO REC.
     ⋮
WRITE REC AFTER 1.
     ⋮
MOVE STOCK FILE
     FROM REC.
```

DOMAIN OBTAINED BY
THE RELATED INVENTION

⇒ [ORDER-FILE, REC ]

⇒ [ORDER-FILE, REC, STOCK-FILE]

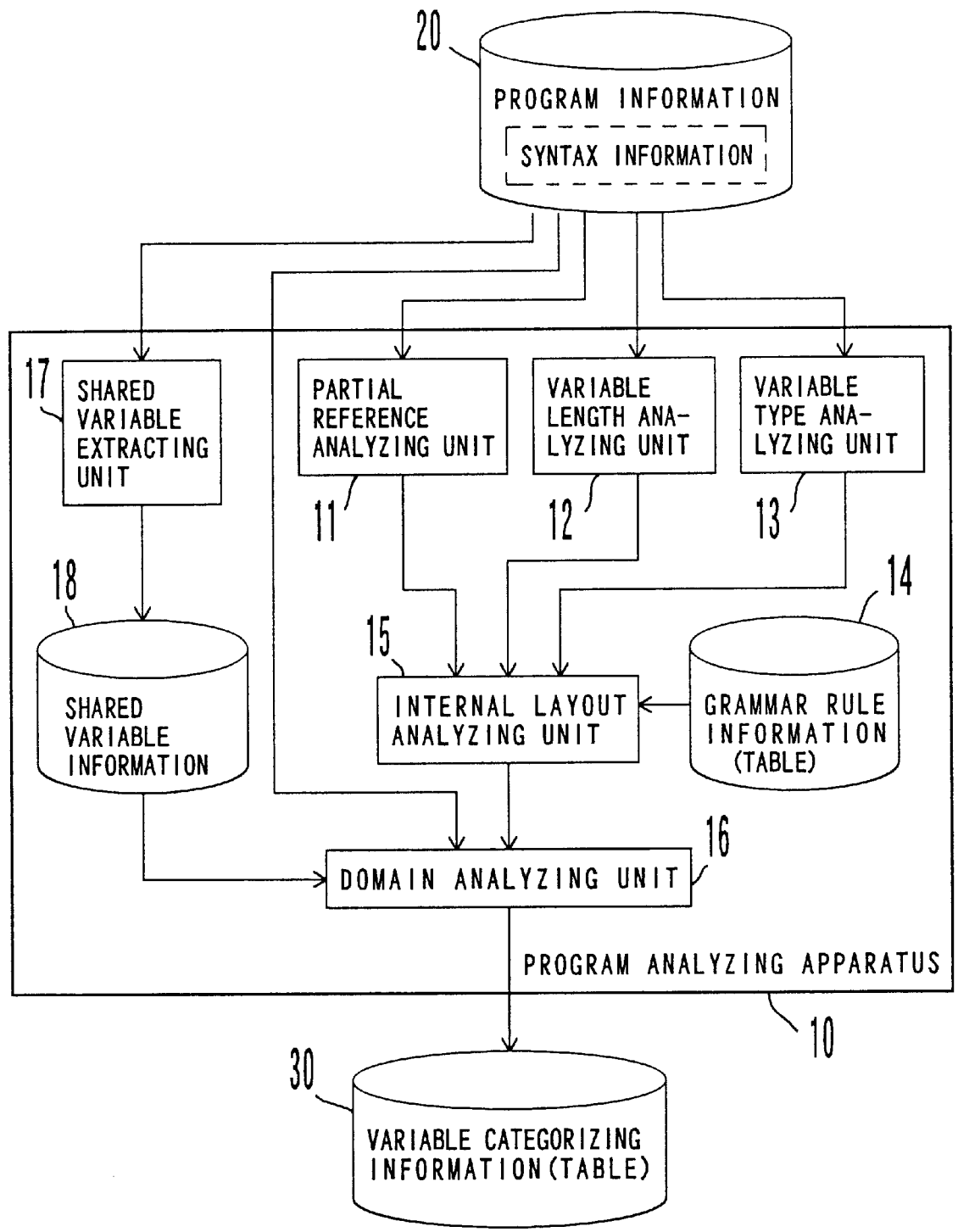
F I G. 10

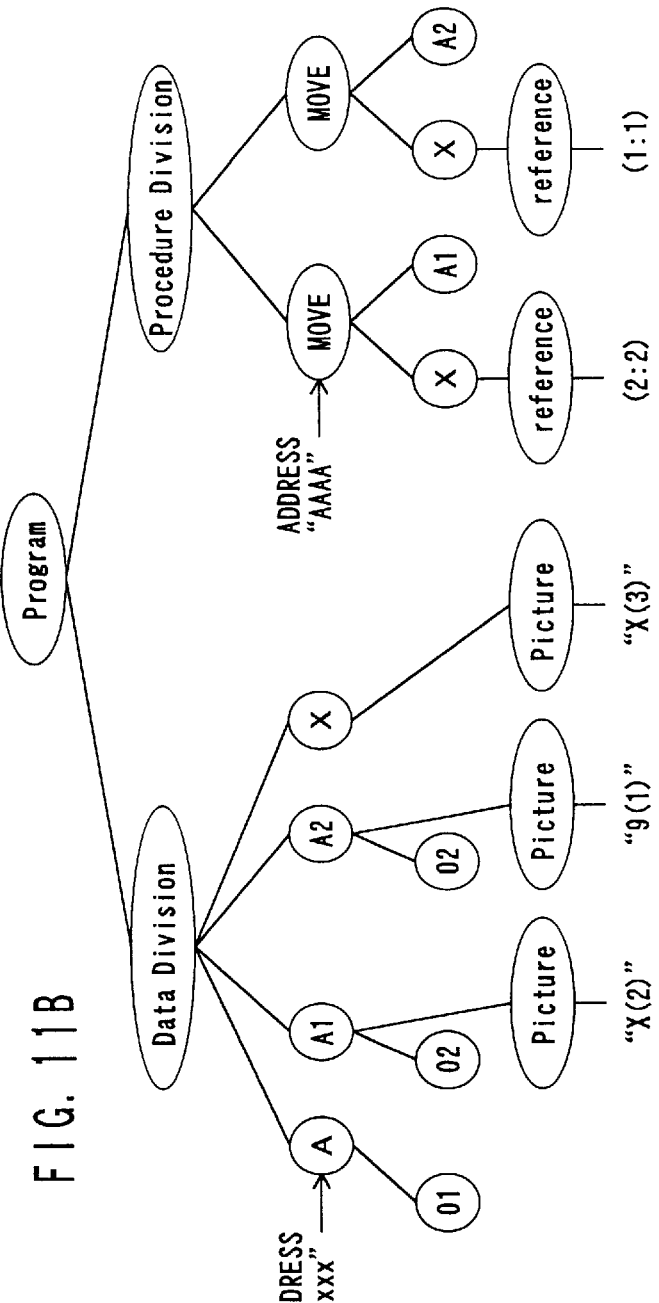

| ASSIGNED VARIABLE / REFERRED VARIABLE | ALPHA-NUMERIC | EXTERNAL DECIMAL | EXTERNAL DECIMAL WITH DECIMAL POINT | GROUP (MULTI-PLE ITEM) | WITH PARTIAL REFERENCE | ... |
|---|---|---|---|---|---|---|
| ALPHA-NUMERIC | 1 | 2 | 3 | 1 | 1 | |
| EXTERNAL DECIMAL | 1 | 2 | 3 | 1 | 1 | |
| EXTERNAL DECIMAL WITH DECIMAL POINT | × | 3 | 3 | 1 | 1 | |
| GROUP | 1 | 1 | 1 | 1 | 1 | |
| WITH PARTIAL REFERENCE | 1 | 2 | 3 | 1 | 1 | |
| ⋮ | | | | | | |

1 : LEFT-JUSTIFY, 2 : RIGHT-JUSTIFY, 3 : ALIGNMENT BY DECIMAL POINT, ...,
× : UNABLE TO ASSIGN

F I G. 1 2 A

| ASSIGNED VARIABLE / REFERRED VARIABLE | ALPHA-NUMERIC | EXTERNAL DECIMAL | EXTERNAL DECIMAL WITH DECIMAL POINT | GROUP (MULTI-PLE ITEM) | WITH PARTIAL REFERENCE | ... |
|---|---|---|---|---|---|---|
| ALPHA-NUMERIC | 1 | 1 | × | 1 | 1 | |
| EXTERNAL DECIMAL | 1 | 2 | 3 | 1 | 1 | |
| EXTERNAL DECIMAL WITH DECIMAL POINT | × | 3 | 3 | 1 | 1 | |
| GROUP | 1 | 1 | 1 | 1 | 1 | |
| WITH PARTIAL REFERENCE | 1 | 1 | 1 | 1 | 1 | |
| ⋮ | | | | | | |

1 : LEFT-JUSTIFY, 2 : RIGHT-JUSTIFY, 3 : ALIGNMENT BY DECIMAL POINT, ...,
× : UNABLE TO COMPARE

F I G. 1 2 B

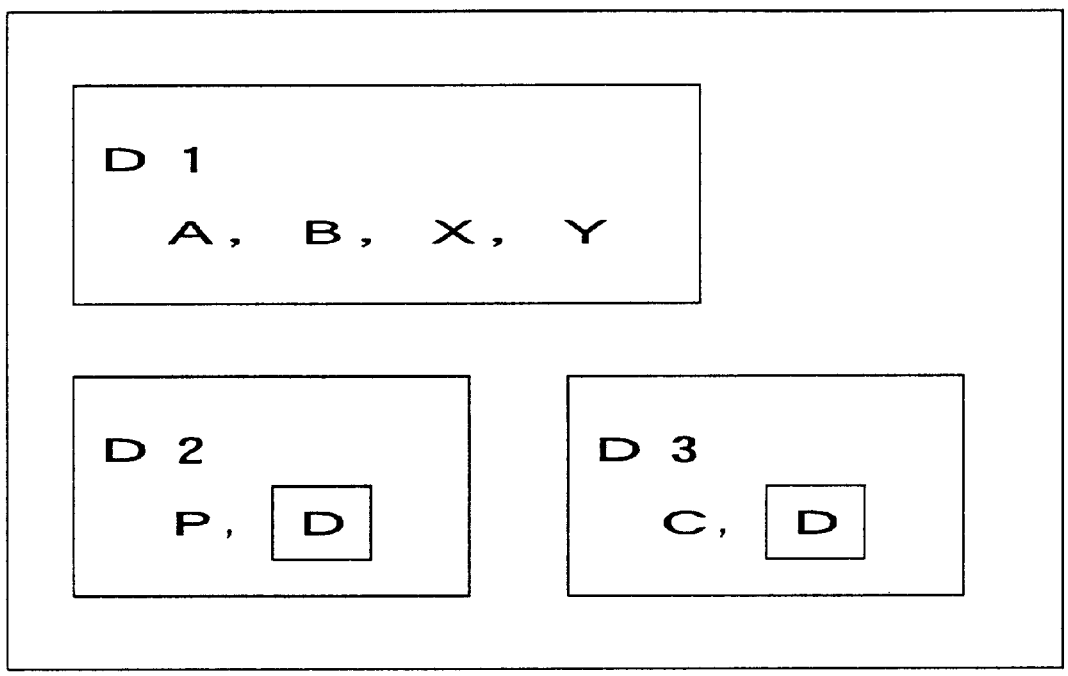
F I G. 16 A
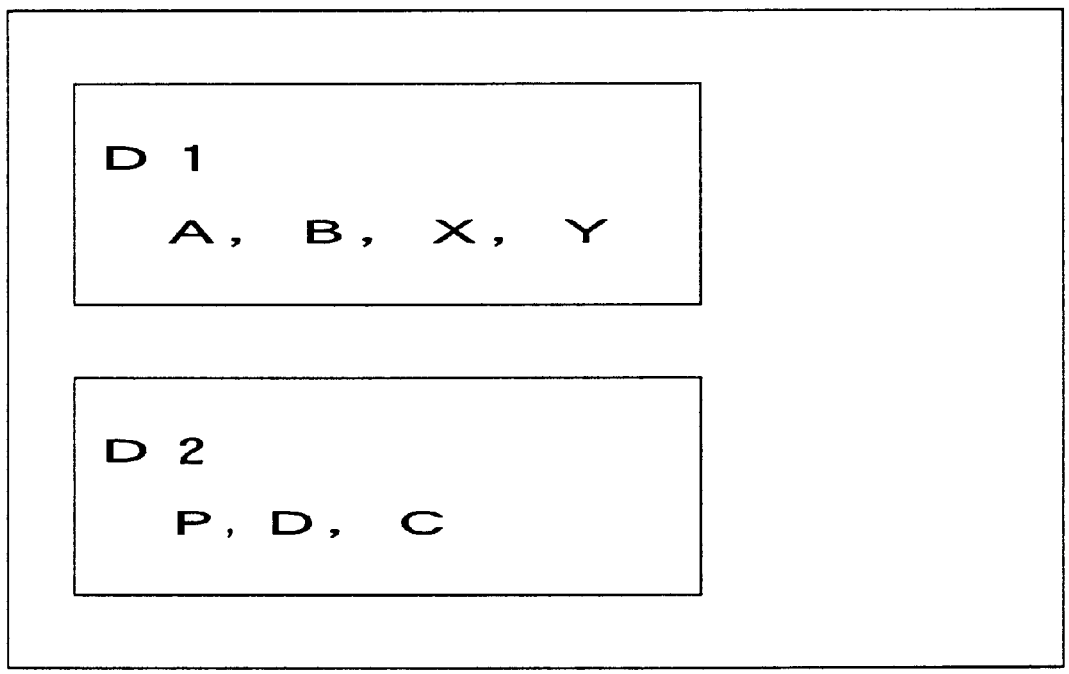
F I G. 16 B

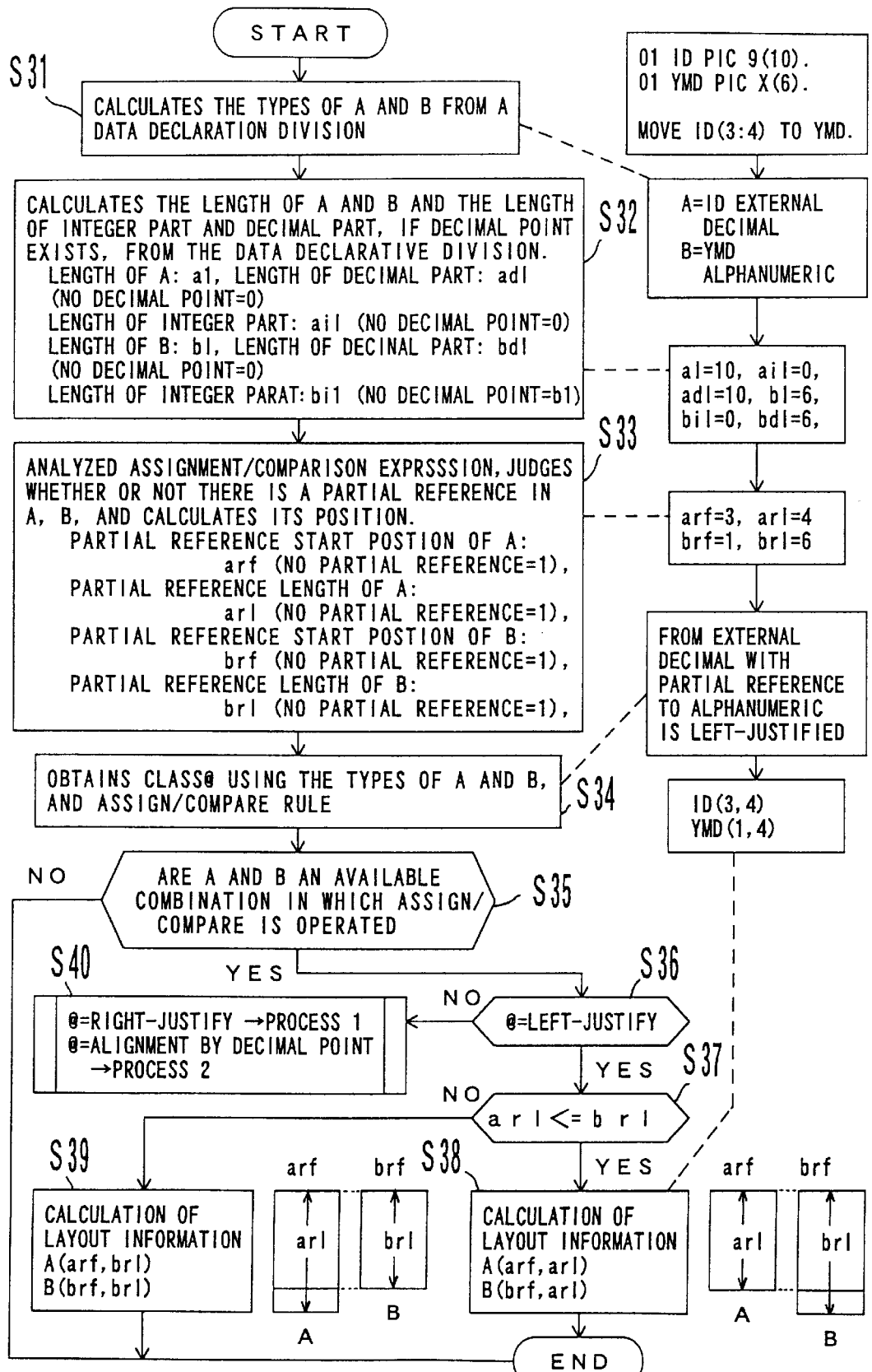
F I G. 17

```
 1  IDENTIFICATION      DIVISION.
 2  PROGRAM-ID          SAMPLE01.
 3  ENVIRONMENT         DIVISION.
 4  DATA                DIVISION.
 5  FILE                SECTION.
 6     FD    ORDER ENTRY.
 7     01    ORDER ENTRY RECORD.
 8           02    SCREEN-PF KEY    PIC X(04).
 9           02    ORDER NO.E    PIC 9(10).
10           02    ITEM NO.E    PIC 9(16).
11           02    BRANCH CODE E    PIC X(06).
12           02    CUSTOMER CODE E    PIC X(06).
13           02    ESTIMATED DELIVERY DATE E    PIC 9(08).
14           02    ORDERED DATE E    PIC 9(08).
15           02    ORDERED QUANTITY E    PIC 9(02).
16           02    MESSAGE E    PIC X(6).
17  *
18     FD    ORDER MASTER.
19     01    ORDER MASTER RECORD.
20           02    ORDER MASTER DATA.
21                 10    ORDER NO.EM    PIC X(10).
22                 10    ITEM NO.EM    PIC 9(16).
23                 10    BRANCH CODE EM    PIC X(06).
24                 10    CUSTOMER CODE EM    PIC X(06).
25                 10    ESTIMATED DELIVERY DATE EM    PIC 9(08).
26                 10    ORDERED DATE EM    PIC 9(08).
27                 10    ORDERED QUANTITY EM    PIC 9(02).
28                 10    SHIPPED QUANTITY EM    PIC 9(02).
29                 10    MESSAGE EM  PIC X(8).    PIC X(8).
30  *
31     FD    STOCK MASTER.
32     01    STOCK MASTER RECORD.
33           02    STOCK MASTER DATA.
34                 10    ITEM NO.SM    PIC 9(16).
35                 10    ITEM NAME SM    PIC N(10).
36                 10    ITM ABBREVIATED NAME SM    PIC X(10).
37                 10    COMMODITY CLASS SM    PIC X(01).
38                 10    CURRENT STOCK QUANTITY SM    PIC 9(07)V9(02).
39                 10    UNALLOTTED STOCK QUANTITY SM    PIC 9(07)V9(02).
40                 10    ALLOTTED STOCK QUANTITY SM    PIC 9(07)V9(02).
41  *
```

FIG. 20

```
42      WORKING-STORAGE      SECTION.
43      01   NUMERIC PICK-UP.
44           02   NUMERIC AREA   PIC 9(20).
45      01   PRINT AREA    PIC X(64).
46  *
47      PROCEDURE             DIVISION.
48           OPEN    1-0     ORDER ENTRY.
49           OPEN    OUTPUT  ORDER MASTER.
50           OPEN    1-0     STOCK MASTER.
51           READ    ORDER ENTRY.
52           IF      SCREEN-PF KEY = "F010"
53                   MOVE    ORDER ENTRY RECORD TO PRINT AREA.
54                   WRITE   PRINT AREA   AFTER 2
55           ELSE
56                   PERFORM  ORDER INPUT
57           END-IF.
58           CLOSE   ORDER ENTRY.
59           CLOSE   ORDER MASTER.
60           CLOSE   STOCK MASTER.
61           EXIT PROGRAM.
62  *
63      ORDER INPUT           SECTION.
64           MOVE    ZERO       TO      NUMERIC AREA.
65           CALL    "SAIBAN"  USING    NUMERIC AREA.
66           IF      NUMERIC AREA  <    0
67                   GO         TO      ERROR PROCESS
68           END-IF.
69           MOVE    NUMERIC AREA(3:10)  TO   ORDER NO.E.
70           ACCEPT  NUMERIC AREA        FROM DATE
71           MOVE    NUMERIC AREA        TO   ORDERED DATE NO.E
72           IF      ITEM NO.   ⟵       0
73                              OR      ITEM NO. IS NOT NUMERIC
74                   GO         TO      ERROR PROCESS
75           END-IF.
76           MOVE    ITEM NO.E          TO ITEM NO.SM.
77           READ    STOCK MASTER.
78                   (ORDERED QUANTITY E > UNALLOTTED STOCK QUANTITY SM)
79                   AND (COMMODITY CLASS SM="0")
80                   GO         TO      ERROR PROCESS
81           END-IF.
```

FIG. 21

```
 82        IF     (ESTIMATED DELIVERY DATE E < ORDERED DATE E +14) AND
 83               (COMMODITY CLASS SM = "1")
 84               GO        TO         ERROR PROCESS
 85        END-IF.
 86        IF     ORDERED QUANTITY E <= UNALLOTTED STOCK QUANTITY SM
 87               COMPUTE   UNALLOTTED STOCK QUANTITY SM = UNALLOTTED
 88                         STOCK QUANTITY SM - ORDERED QUANTITY E
 89               COMPUTE   ALLOTTED STOCK QUANTITY SM = ALLOTTED STOCK
 90                         QUANTITY SM + ORDERED QUANTITY E
 91        END-IF.
 92        MOVE   STOCK MASTER RECORD  TO   PRINT AREA.
 93        WRITE  PRINT AREA    AFTER 3.
 94        MOVE   ORDER NO. E          TO   ORDER NO. EM.
 95        MOVE   BRANCH CODE E        TO   BRANCH CODE EM.
 96        MOVE   ITEM NO. E           TO   ITEM NO. EM.
 97        MOVE   CUSTOMER CODE E      TO   CUSTOMER CODE EM.
 98        MOVE   ESTIMATED DELIVERY DATE E
                                       TO   ESTIMATED DELIVERY DATE EM.
 99        MOVE   ORDERED DATE E       TO   ORDERED DATE EM.
100        MOVE   ORDERED QUANTITY E   TO   ORDERED QUANTITY EM.
101        MOVE   ZERO                 TO   SHIPPED QUANTITY EM.
102        WRITE  ORDER MASTER RECORD.
103        MOVE   "RECEIVED NORMALLY MESSAGE"
                                       TO   MESSAGE E.
104        MOVE   ORDER ENTRY RECORD   TO   PRINT AREA.
105        WRITE  PRINT AREA    AFTER 2.
106        GO     TO       EXIT OF ORDER INPUT.
107    ERROR PROCESS.
108        MOVE   "ERROR"              TO   MESSAGE E.
109        MOVE   ORDER ENTRY RECORD   TO   PRINT AREA.
110        WRITE  PRINT AREA    AFTER 2.
111    EXIT OF ORDER INPUT.
112    EXIT.
```

F I G. 2 2

| ONE DOMAIN { | DOMAIN(NAME LIST OF VARIABLE) |
|---|---|
| | ORDER ENTRY RECORD<br>ORDER MASTER RECORD<br>STOCK MASTER RECORD<br>PRINT AREA |
| | ORDER NO. E<br>ORDER NO. EM<br>NUMERIC AREA<br>ESTIMATED DELIVERY DATE EM<br>ESTIMATED DELIVERY DATE E<br>ORDERED DATE EM<br>ORDERED DATE E |
| | ITEM NO. EM<br>ITEM NO. E<br>ITEM NO. SM |
| | BRANCH CODE EM<br>BTANCH CODE E |
| | CUSTMER CODE EM<br>CUSTMER CODE E |
| | ORDERED QUANTITY EM<br>ORDERED QUANTITY E<br>UNALLOTTED STOCK QUANTITY SM<br>ALLOTTED STOCK QUANTITY SM |

F I G. 2 3 A

| DOMAIN(NAME LIST OF VARIABLE) | } ONE DOMAIN |
|---|---|
| ORDER ENTRY RECORD<br>*PRINT AREA | |
| ORDER MASTER RECORD<br>*PRINT AREA | |
| STOCK MASTER RECORD<br>*PRINT AREA | |
| ORDER NO. E<br>ORDER NO. EM<br>NUMERIC AREA (3, 10) | |
| ESTIMATED DELIVERY DATE EM<br>ESTIMATED DELIVERY DATE E<br>ORDERED DATE EM<br>ORDERED DATE E<br>NUMERIC AREA (13, 8) | |
| ITEM NO. EM<br>ITEM NO. E<br>ITEM NO. SM | |
| BRANCH CODE EM<br>BTANCH CODE E | |
| CUSTMER CODE EM<br>CUSTMER CODE E | |
| ORDERED QUANTITY EM<br>ORDERED QUANTITY E<br>UNALLOTTED STOCK QUANTITY SM<br>(6, 2)<br>ALLOTTED STOCK QUANTITY SM<br>(6, 2) | |

F I G. 2 3 B

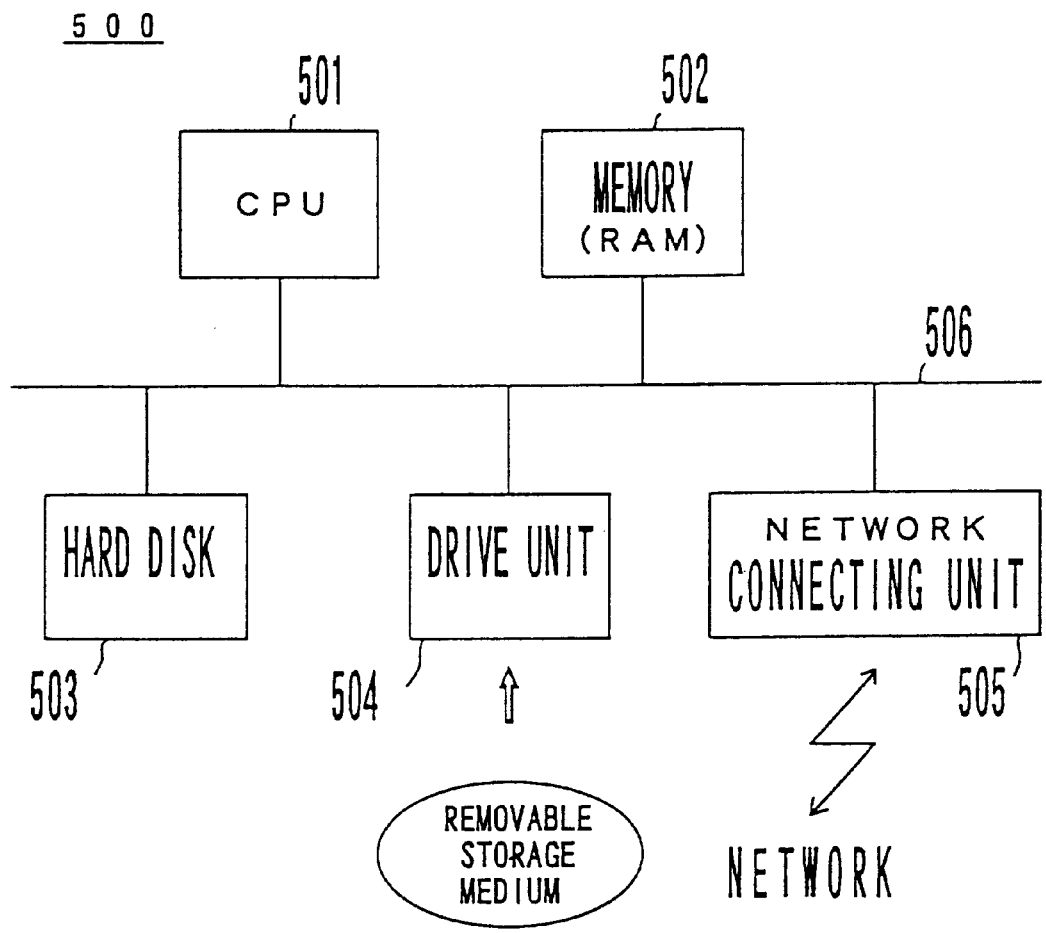
F I G. 2 4

PROGRAM ANALYZING APPARATUS WHICH CATEGORIZES VARIABLES INTO DOMAINS AND METHOD THEREOF

BACKGROUND OF THE INVENTION

1. Field of the Invention

The present invention relates to an apparatus for analyzing a program and for displaying its result, more particularly to an apparatus and method for analyzing the program and categorizing a variable used in the program based on specific requirements.

2. Description of the Related Art

To understand the detailed processing of a program it is indispensable to analyze its variables, in particular to analyze information on its variables at the time of their declarative statements and the values held by the variables.

The conventional program analysis is limited to extracting the type and size of variables from a declarative statement on each data, and analyzing this only. For example, information on the type and size of each data as shown in FIG. 1B was obtained from the declarative statement on each data (variable) in the data declaration division of the COBOL program shown in FIG. 1A as the result of data type analysis.

By using the analysis result shown in FIG. 1B, for example, it can be judged that "ordered month", "ordered day", "delivered month" and "delivered day" are the same in both data type (numeric) and data size (2 digits). However, it cannot be judged from this analysis result whether or not each of the variable belongs to the same group.

For example, both "ordered day" and "delivered day" have the common restricting condition that the range of data value is "between 1 and 31". Namely, these data both belong to a domain "Day: Its range is between 1 and 31". On the other hand, for example, although "ordered day" and "ordered month" are the same in data type and data size, they are different in restricting condition. Namely, the restricting condition of an "ordered day" is "an integer between 1 and 31", while the restricting condition of an "ordered month" is "an integer between 1 and 12". Namely, each of the "ordered day" and "ordered month" belongs to a different domain.

In a wide sense, a domain means "a defined area" or "an area of certain knowledge or interest", and in a narrow sense, it means "an object characterized by a featured concept". For example, both "ordered date" and "delivered date" belong to a concept of "year/month/day", and in this case, "year/month/day" is a common domain for them. The "year/month/day" can be divided into "year", "month" and "day", and each of them corresponds to one domain.

A domain definition means a domain defined using a restricting condition (value range). For example, both "day" and "month" are defined as "an integer between 1 and 31" and "an integer between 1 and 12", respectively.

If this domain information (restricting condition of each variable, etc.) can be automatically extracted from an existing program, it will be very useful for the understanding, debugging, maintenance, improvement, etc of a program.

The applicant of the present invention has previously filed an application relating to an apparatus and method for extracting the relation between variables used in a program from the program, and categorizing them according to their domain (U.S. patent application Ser. No. 08/794,368). The invention is referred to hereinafter as the "Related invention".

The related invention discloses a technology for extracting a restricting condition given to each variable used in a program, and categorizing variables based on the restricting condition. For example, in the above example, the variable of which the restricting condition is defined as "an integer between 1 and 31" is extracted as a variable belonging to the domain of "day", the variable of which the restricting condition is defined as "an integer between 1 and 12" is extracted as a variable belonging to a domain of "month", and they are categorized by domain. The related invention also discloses a technology for categorizing variables by domain using an executable statement such as an assignment statement or comparison expression including variables. For example, when there is an executable statement of "MOVE var-a TO var-b", it is judged that both variable var-a and variable var-b belong to the same group.

SUMMARY OF THE INVENTION

The present invention is an improvement and development of the above-described related invention. It is a further object of the present invention to provide an apparatus and method for accurately categorizing variables used in a program based on the desired requirements. Particularly, the variables can be categorized by the same and/or different domain with a high accuracy even when there is a specific assignment relation between the variables.

A program analyzing apparatus of the present invention is based on the configuration which analyzes the relation among variables by the type of an executable statement or the type of operand when a plurality of variables are used in an executable statement in a program. The apparatus comprises detecting means for detecting the length of each of the plurality of variables, data type of each of the plurality of variables, and each range to be referred or assigned by the executable statement for the plurality of variables, and judging means for judging whether or not the plurality of variables belong to the same domain using the detection result of said detecting means.

According to the configuration, the apparatus judges whether or not a plurality of variables used in a program belong to the same group considering the case that only a part of a variable is assigned to another variable, or that a variable is assigned to a certain range of another variable.

A program analyzing apparatus of another aspect of the present invention is based on the configuration which analyzes the relation among variables by the type of an executable statement or the type of operand when a plurality of variables are used in an executable statement in a program. The apparatus comprises extracting means for extracting a variable to be used as a buffer from the variables used in the program, and judging means, when there is an assignment or comparison relation between a first variable and a second variable, and when there is also an assignment or comparison relation between the first variable and a third variables, for judging whether or not the second and third variables belong to the same domain based on whether or not the first variable is to be used as a buffer.

According to the configuration, when a plurality of variables are correlated via a buffer, the apparatus does not simply categorize the variables in the same group, but categorizes them considering other factors.

BRIEF DESCRIPTION OF THE DRAWINGS

FIGS. 1A and 1B are diagrams explaining the variable categorizing method of the prior art.

FIG. 4 is a diagram explaining the analyzing process by the program analyzing apparatus of the related invention.

FIG. 10 is a block diagram of the program analyzing apparatus of an embodiment of the invention.

FIG. 11A shows an example of the program which is an analyzing target.

FIGS. 11B and 11C are diagrams showing an example of the syntactical information from the program information corresponding to the program shown in FIG. 11A.

FIGS. 12A and 12B are examples of grammar rule information (tables).

FIGS. 16A and 16B are display examples of the analysis results obtained by the process of the flowchart shown in FIG. 15.

FIG. 17 is a flowchart explaining the process for analyzing the internal layout of a variable.

FIGS. 20 to 22 are examples of target programs.

FIG. 23A is a drawing showing the result of the case where the programs in FIGS. 20 to 22 are analyzed using the related invention.

FIG. 23B is a drawing showing the result of the case where the programs in FIGS. 20 to 22 are analyzed using this embodiment.

FIG. 24 is a block diagram of the data processing device for realizing the program analyzing apparatus of this embodiment.

DETAILED DESCRIPTION OF THE INVENTION

Before describing the detailed embodiment of the present invention, the configuration and operation of the related invention (U.S. patent application Ser. No. 08/794,368) are briefly described. Although the analyzing example of a COBOL program is described below, this invention is not necessarily limited to a COBOL program.

In the related invention, a "domain" is used as a method for categorizing variables used in a program. In a wide sense a domain means "a defined area" or "an area of certain knowledge or interest", and in a narrow sense it means "an object characterized by a featured concept". For example, both "ordered date" and "delivered date" belong to a concept of "year/month/day" in the example shown in FIG. 1, and in this case a "year/month/day" is a common domain for them. The "year/month/day" can be divided into "year", "month" and "day", and each of them corresponds to one domain.

Figure 2:
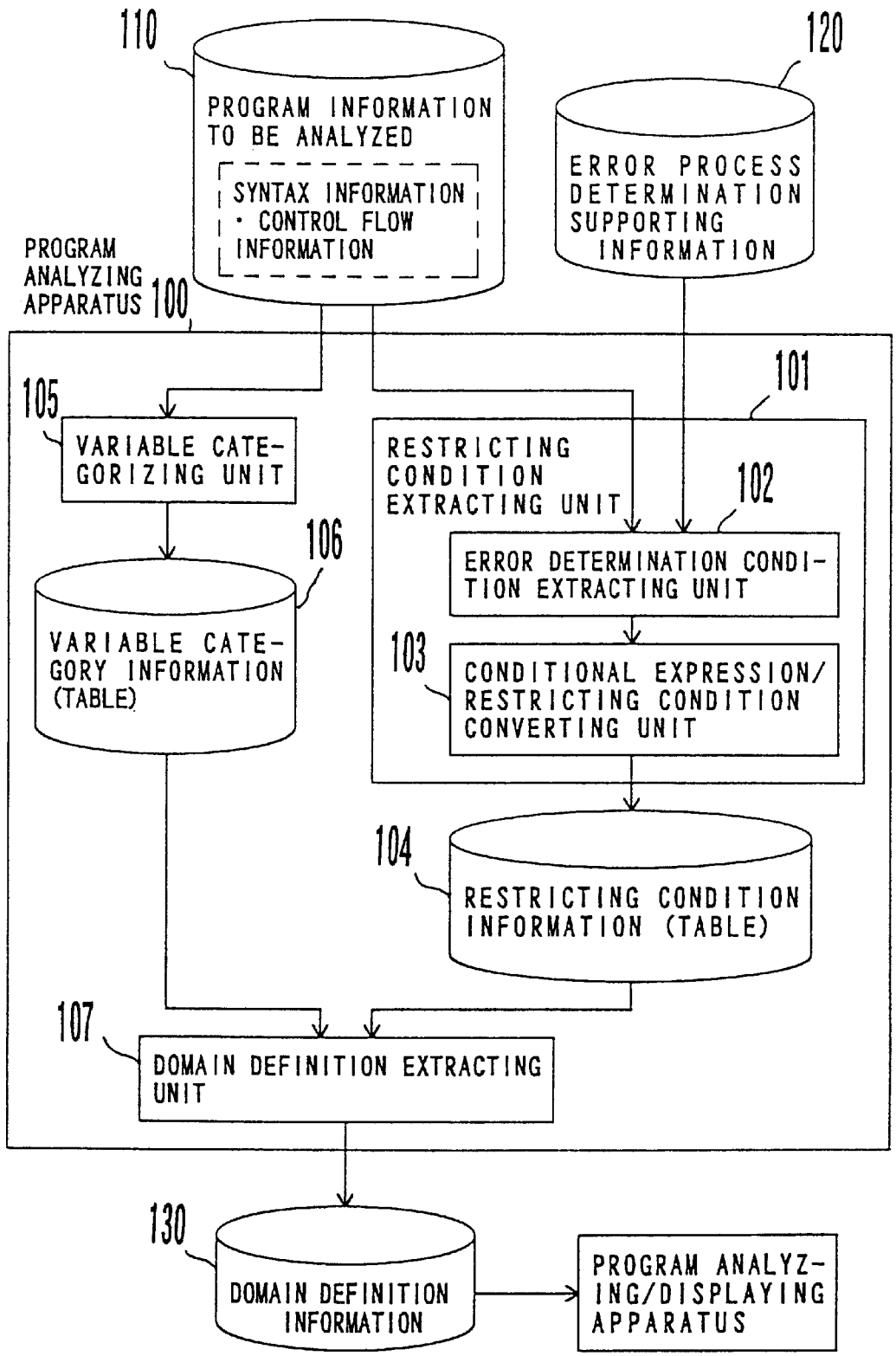
FIG. 2 is a block diagram showing the configuration of the program analyzing apparatus of the related invention.

FIG. 2 is a block diagram of the program analyzing apparatus of the related invention. This program analyzing apparatus categorizes variables used in a given program based on the restricting condition of each variable. This program analyzing apparatus also extracts the executable statement in which a plurality of variables are used, and judges whether or not those variables belong to the same domain based on the type of the executable statement or its operand.

A program analyzing apparatus 100 uses program information to be analyzed 110 and error process determination supporting information 120 as information for analyzing a given program. The program information to be analyzed 110, for example, is syntactical information obtained by analyzing the syntax of the program and control flow information for showing the relation of statements following the executing order of a program. The information includes in which statement variables in the program are used, and under what condition those variables are executed. The error process determination supporting information 120 is information about the names of error process procedures and information on the line numbers in which error processes are described.

A restricting condition extracting unit 101 comprises an error determination condition extracting unit 102 and a conditional expression/restricting condition converting unit 103. The error determination condition extracting unit 102 recognizes the error process division in the program based on the program information to be analyzed 110 and the error process determination supporting information 120, and extracts conditions for executing an error process. The conditional expression/restricting condition converting unit 103 obtains restricting conditions given to a specific variable by analyzing the output of the error determination condition extracting unit 102, and by converting its conditional expression to its restricting conditions. The restricting condition extracting unit 101 outputs information on the extracted restricting conditions. The information on the restricting conditions is held in a restricting condition information table 104.

For example, the variable representing a "month" ("ordered month" and "delivered month" in the example of FIG. 1) and the variable representing a "day" ("ordered day" and "delivered day" in the example of FIG. 1)"are usually given as "an integer between 1 and 12" and "an integer between 1 and 31" as their restricting conditions, respectively. These restricting conditions of variables are usually defined in the declarative division of a program. The restricting condition extracting unit 101 categorizes a variable according to these restricting conditions.

A variable categorizing unit 105, when a plurality of variables are used in a certain executable statement in a given program, analyzes the relation among the plurality of variables by the type of the executable statement or its operand. For example, when the executable statement of "MOVE var-a TO var-b" is described in a given program, it is judged that both variables var-a and var-b belong to the same group (domain). The variable categorizing unit 105 categorizes those variables based on the domain to which each variable belongs, and outputs its categorized result (variable categorizing information). The variable categorizing information is held in a variable categorizing information table 106.

A domain definition extracting unit 107 extracts definition information on the variable belonging to each domain using the restricting condition information obtained from the restricting condition extracting unit 101 (restricting condition information table 104) and the variable categorizing information obtained from the variable categorizing unit 105 (variable categorizing information table 106), and outputs them as a domain definition information 130. For example, when it is judged by the restricting condition extracting unit 101 that both variables var-a and var-c belong to the same domain, and by the variable categorizing unit 105 that both variables var-a and var-b belong to the same domain, the domain definition extracting unit 107 infers that all the variables var-a, var-b and var-c belong to the same domain.

A program analyzing apparatus 100 displays the result obtained by analyzing the variables as described above on a display screen. A user can easily determine variable groups belonging to the same domain, and can analyze the program thoroughly. This categorizing information is also useful in debugging the program.

Figure 3:
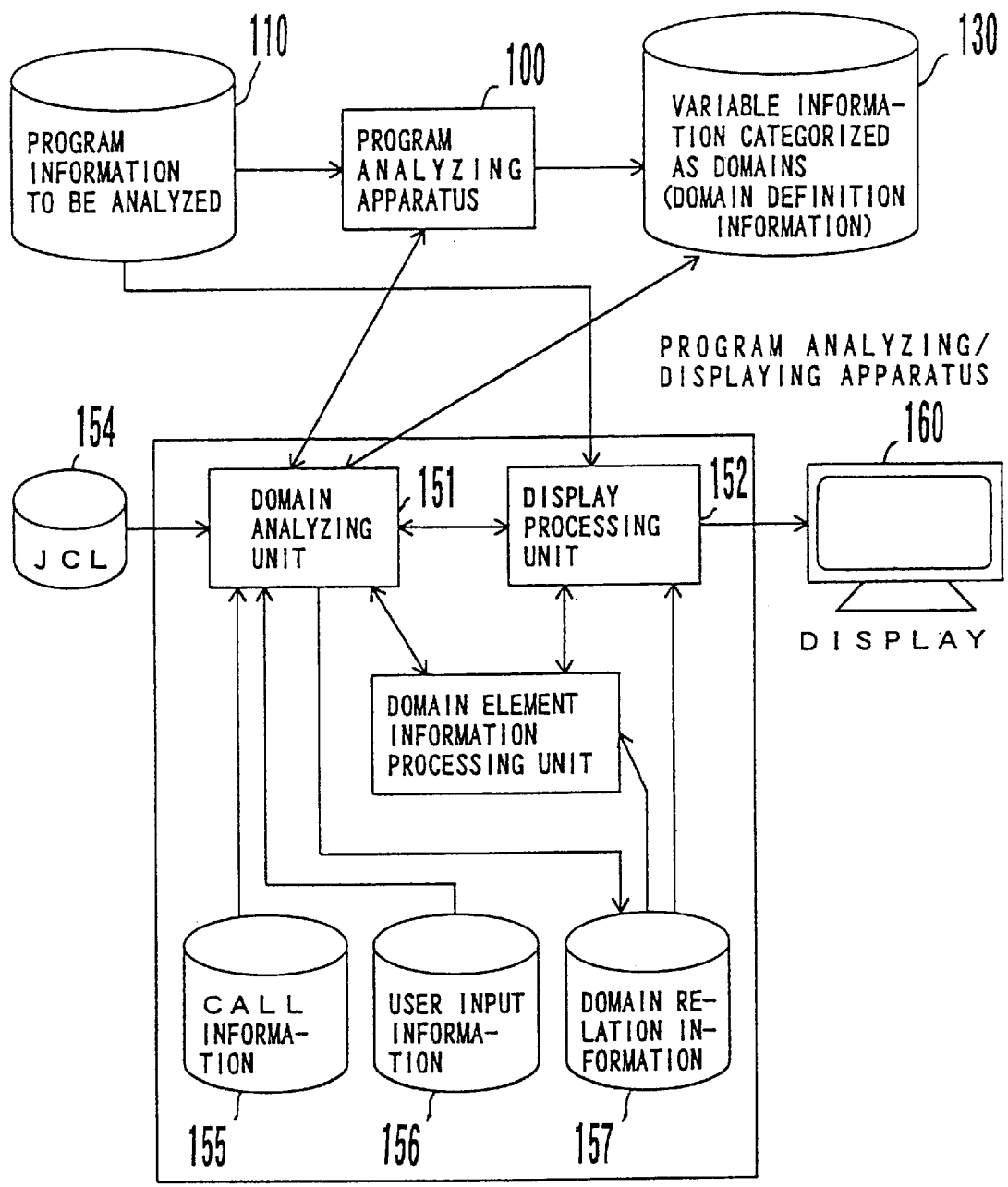
FIG. 3 is a block diagram showing the configuration of the program analyzing/displaying device of the related invention.

FIG. 3 is a block diagram of the program analyzing/displaying apparatus of the related invention. This program analyzing/displaying apparatus analyses a plurality of given programs, receives the domain definition information for each program output from the program analyzing apparatus 100 shown in FIG. 2, and analyzes the relation among variables and domains used in a plurality of those programs. This program analyzing/displaying apparatus also displays its analyzed result so they are easy to understand.

A domain analyzing unit 151 analyses the relation among a plurality of domains obtained from a plurality of programs using variable information 130 or job control language information(JCL) 154. The analyzed result of the domain analyzing unit 151 is domain relation information 157. The variable information 130 is the analyzed result obtained by the program analyzing apparatus 100 shown in FIG. 2. The job control language information 154 is the information in which the executing order of application and utility programs, etc. are described using a job control language.

The domain analyzing unit 151 can recognize the relation between a domain obtained from a calling party's program and a domain obtained from a called party's program, using information on an instruction used when calling up another program from a certain program (CAll information 155). The domain analyzing unit 151 can also analyze the relation among a plurality of domains obtained from a plurality of programs using user input information 156 input by a user.

A display processing unit 152 displays domain relation information 157 on a display 160. The display processing unit 152 displays the relation among a plurality of domains included in a plurality of programs and the assignment relation of variables belonging to each domain as a graph, which is easy for a user to understand.

Next, the analyzing method of the program analyzing apparatus of the related invention and its problems are described below referring to FIGS. 4 to 9. The details of the problems which can be solved by the present invention are described later.

FIG. 4 is a diagram explaining the analyzing process of the program analyzing apparatus 100. The program analyzing apparatus 100 outputs the analyzed results shown when a program described in a COBOL language is analyzed. The variable categorizing unit 105 judges that an assigned variable and a referred variable both belong to the same domain in an assignment expression. This judgement is due to the fact that there is no possibility that a variable belonging to a certain domain is assigned to a variable belonging to another domain; such that assigning "amount of money" to "date" or assigning "year" to "month" usually cannot happen. Therefore, the variable categorizing unit 105 judges that both variables A and B belong to the same domain when extracting an executable statement of "MOVE A TO B".

The variable categorizing unit 105 also judges that variables compared in a comparison expression belong to the same domain taking into consideration the fact that there is no possibility that a variable belonging to a certain domain is compared with a variable belonging to another domain. Therefore, when it extracts an executable statement of "if X>Y . . .", it judges that both variables X and Y belong to the same domain. In the same way, it is judged that both variables B and C belong to the same domain by an executable statement of "ADD B TO C", and as its result it is judged that all the variables A, B and C belong to the same domain. The analyzed result shown in FIG. 4 can be obtained in this manner.

As described above, in the related invention variables were categorized for each domain based on the type of an executable statement or its operand. However, in the analysis of this related invention, for example, when a certain variable is assigned to the specific position of another variable, or when part of a certain variable is assigned to another variable, its analyzed result was often not appropriate. Concrete examples are shown in FIGS. 5 to 9.

Figure 5:
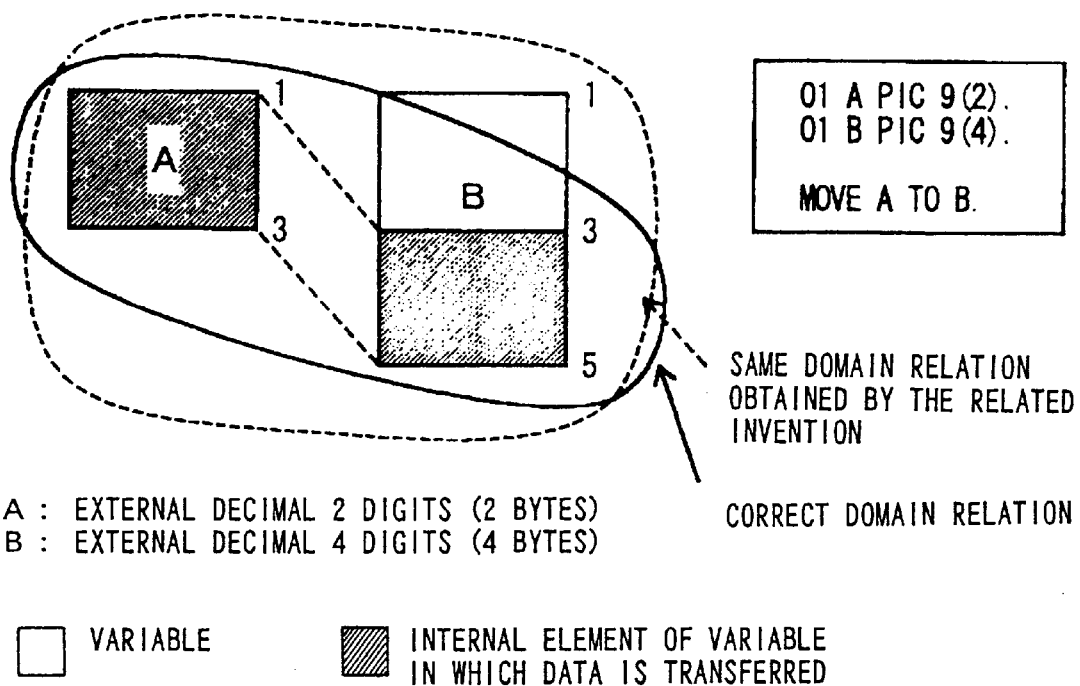
FIG. 5 is a diagram explaining the process in the case of analyzing the executable statement in which a certain variable is assigned to a variable with a different length.

FIG. 5 is a diagram explaining the process for analyzing the executable statement in which a certain variable assigned to a variable with a different length is analyzed. It is assumed that a variable A is an external decimal 2 digits (2 bytes), and a variable B is an external decimal 4 digits (4 bytes). Here, when analyzing the executable statement of "MOVE A TO B" in which the variable A is assigned to part of the variable B using the technology of the related 3invention, it is judged that both variables A and B belong to the same domain. Although this judgement is not incorrect, the analyzed result of "the variable A and an internal element of the variable B belong to the same domain" may be required. Such a request, for example, seems to be made in the process in which "year 97" should be replaced with "year 1997".

Figure 6:
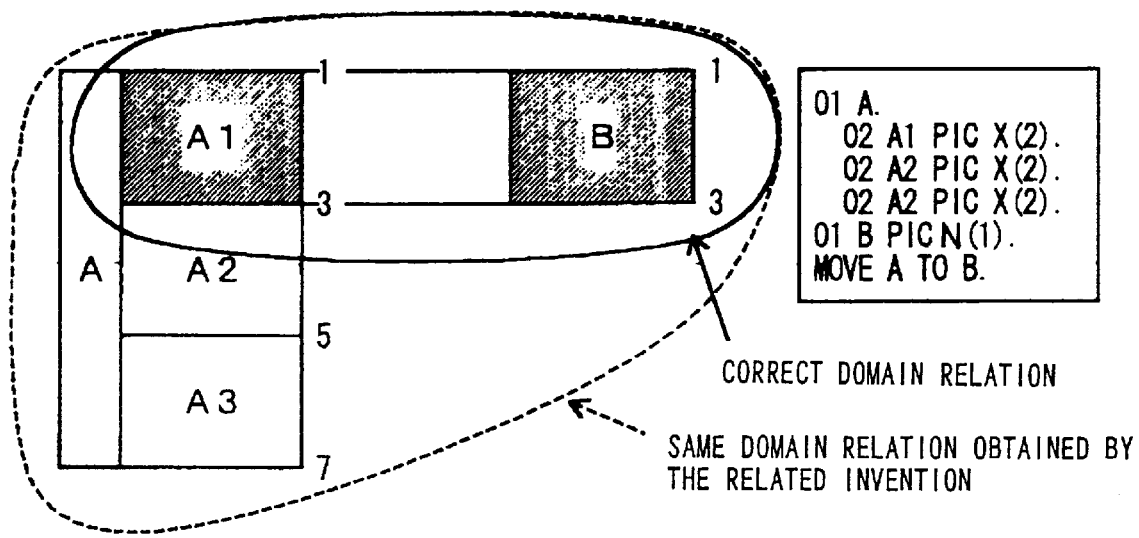
FIG. 6 is a diagram explaining the process in the case of analyzing the executable statement in which a group item variable is assigned to another variable.

FIG. 6 is a diagram explaining the process for analyzing the executable statement in which a multiple item variable is assigned to another variable. It is assumed that a variable A is a multiple item variable of 6 digits (6 bytes) consisting of variables A1 of 2 bytes, A2 of 2 bytes and A3 of 2 bytes, and a variable B is a variable of 2 bytes (for example, a Japanese character of 1 digit). Here, if it is assumed, for example, that the variables A, A1, A2, A3 and B are "ordered date", "year", "month", "day" and "ordered year", respectively, the variable A1 is left-justified and transcribed to the variable B when the variable A is assigned to the variable B by the executable statement of "MOVE A TO B". However, when analyzing this executable statement using the technology of the related invention, it is judged that both variables A and B belong to the same domain. Although this judgement is not incorrect, the analyzed result of "an internal element of variable A and the variable B belong to the same domain" may be required.

Figure 7:
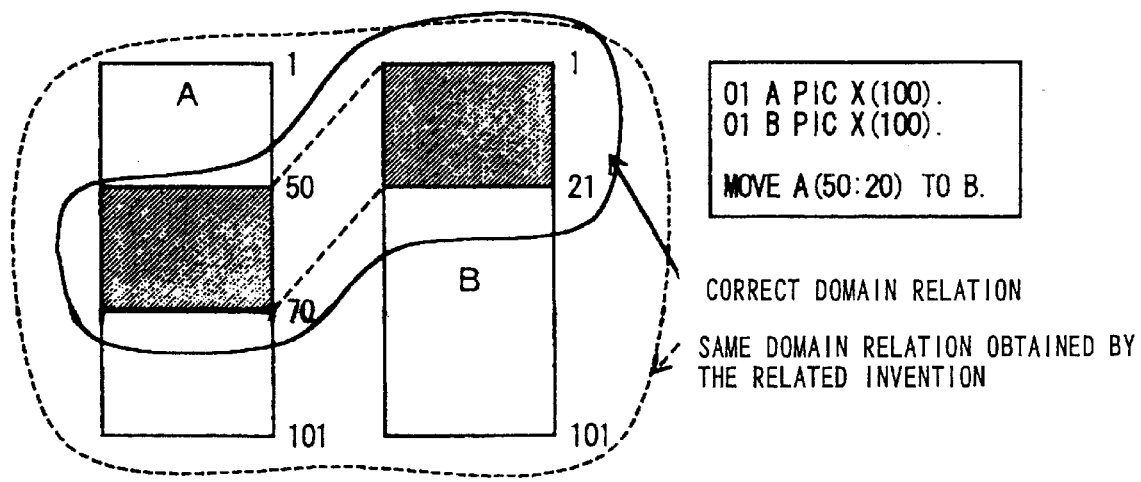
FIG. 7 is a diagram explaining the process in the case of analyzing an executable statement of an assignment with a partial reference.

FIG. 7 is a diagram explaining the process for analyzing an executable statement for an assignment with partial reference. The "assignment with partial reference" means to designate a part of a referred variable and to transcribe the designated contents into an assigned variable. It is assumed that both variables A and B are alphanumerics of 100 digits (100 bytes), and that date data of 6 digits are set to the 50th to 55th digits of the variable A. The executable statement of "MOVE A (50:6) TO B" is a command for assigning the 6-digit data (i.e. date data) in the 50th to 55th digits of the variable A to the variable B. When analyzing this executable statement using the technology of the related invention, it is judged that both variables A and B belong to the same domain. However, the variables A and B do not directly correspond to each other 1 to 1, and strictly speaking, only part of the variables A and B correspond to each other.

Figures 8A, 8B:
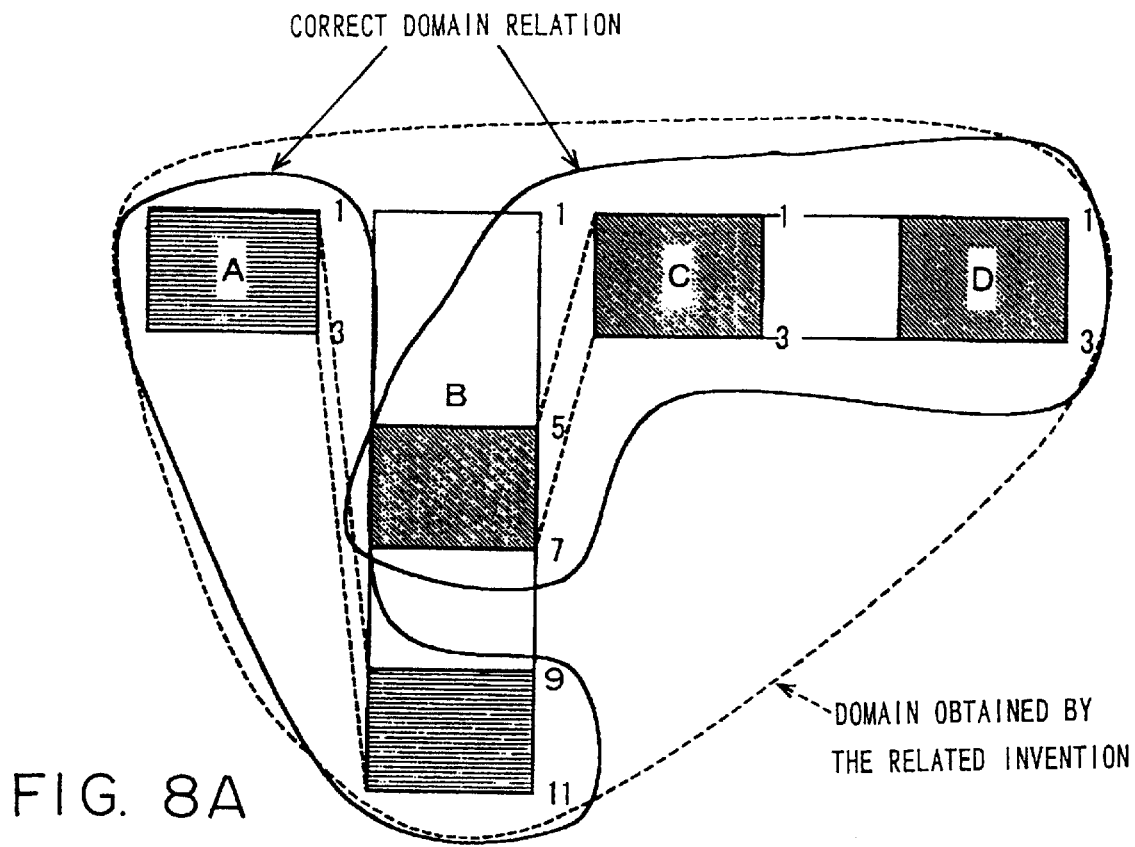
FIGS. 8A and 8B are diagrams showing an example in which it is judged that unrelated variables in the related invention belong to the same domain.

FIGS. 8A and 8B are diagrams showing an example in which it is judged that unrelated variables belong to the same domain in the related invention. When analyzing the program shown in FIG. 8B using the technology of the related invention, first, it is judged by the executable statement of "MOVE A TO B" that both variables A and B belong to the same domain, also by that of "MOVE B (5:2) TO C" that both variables B and C belong to the same domain, and further by that of "MOVE C TO D" that both variables C and D belong to the same domain, respectively. As a result, it is judged that all variables A, B, C, and D belong to the same domain. However, actually the variable A does not necessarily belong to the same domain as the variables C and D, as shown in FIG. 8A.

Accordingly, in the related invention, when the executable statement in which part of a variable is assigned to another variable, in which part of a variable is compared with another variable, or in which variables of different length are transcribed to each other or compared with each other, is analyzed, the position and range in some variable in which an assignment or comparison is actually executed is not taken into consideration. For this reason, as shown in FIGS. 8A and 8B, when a domain analysis is executed for a plurality of executable statements in a program, there is the possibility that it is judged that variables having no transcribed relation with each other belong to the same domain. When an analyzed result such as this is output, it finally has to be judged by a user whether or not the variables really belong to the same domain, which means to impose a burden on a program analyzer.

It is an object of the present invention to solve the problems as shown in FIGS. 5 to 8, and that the categorizing accuracy of a variable can be improved compared with that of the related invention.

Figures 9A, 9B:
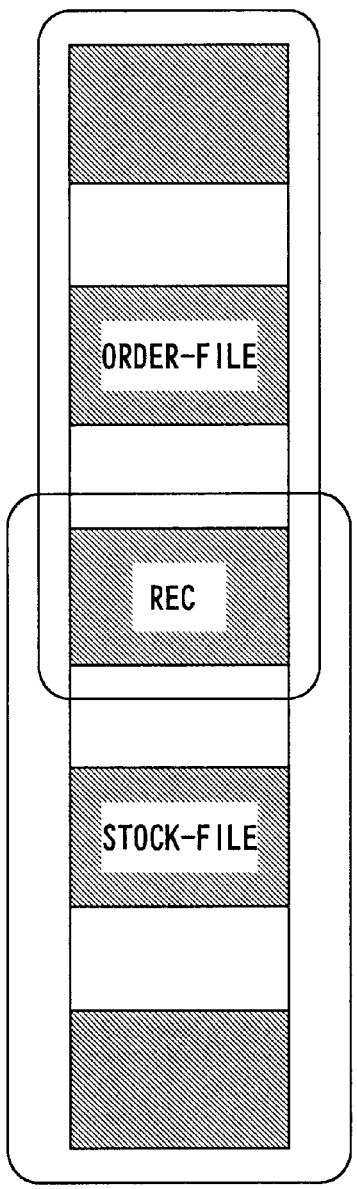
FIGS. 9A and 9B show a program explaining the problem in the case where a program includes a shared variable in the related invention.

FIGS. 9A and 9B are diagrams explaining the problems in the case where a shared variable is included in a given program in the related invention. The "shared variable" means a variable or a record which can be commonly owned by a plurality of variables, such as, for example, a buffer record or a document record used for file writing and so on. In the program shown in FIG. 9B, REC is a shared variable. In the example shown in FIG. 9B when writing a stock file and an order file, the contents of both files are once assigned to a buffer record REC.

When analyzing the program shown in FIG. 9B using the technology of the related invention, it is judged by the first "MOVE" executable statement that the stock file and "REC" both belong to the same domain, and it is judged by the second "MOVE" executable statement that the order file and "REC" both belong to the same domain. Therefore, even when the stock file and the order file actually do not belong to the same domain, it is judged from the two judgement results described above that they belong to the same domain. Accordingly, when a shared variable is included in a target program, there is the possibility that it is judged that variables unrelated to each other belong to the same domain, when analyzing using the method of the related invention. A wrong link among variables such as this may be called "noise".

It is another object of the present invention to solve the problem shown in FIGS. 9A and 9B, and to prevent noise concerning a domain from spreading.

FIG. 10 is a block diagram of the program analyzing apparatus of an embodiment of the present invention. A program analyzing apparatus 10 refers to program information 20 when analyzing a program. The program information 20 is information on a target program, and includes syntactical information obtained by analyzing the syntax of the program. The syntactical information can be extracted from the program using a prior art (for example, a compiler).

FIG. 11A is an example of a target program. FIGS. 11B and 11C are examples of the syntactical information in the program information corresponding to the program shown in FIG. 11A.

As shown in FIG. 11B, the "Data Division" of the syntax information includes the definition information of each variable used in a program. This information is extracted from the declarative division of the program. As the definition information of a variable, data type, data length and the subordinate relation among variables are included. The subordinate relation of a variable is as follows. For example, when "date data" is composed of "year data", "month data" and "day data", the "year data", "month data" and "day data" are called the subordinate variables or subordinate items of the "date data". When a certain variable is composed of a plurality of items, the variable is called a multiple item variable.

The "Procedure Division" includes information on which variable is used in each executable statement described in a program. This information is extracted from the body of a program. In the example shown in to FIG. 11B it is shown that variables X and A1 are used in one "MOVE" executable statement, while variables X and A2 are used in the other "MOVE" executable statement. The information on whether or not a partial reference of a variable is executed in each executable statement is stored as the syntactical information of the program. The "partial reference of a variable" means, for example, the information defined in an executable statement, etc. in which part of a certain variable is assigned to another variable, and information on the start position and length in the variable of its referred portion. Since it is defined in the executable statement shown in FIG. 7 that from the 50th to 55th digit of a variable A are assigned to a variable B, in this case (50:6) can be obtained as its partial reference data.

FIG. 11C is a table in which the storage address of the syntactical information of FIG. 11B. In this table an address is set for indicating the area in which information on each variable is stored.

The explanation will mow go back to FIG. 10. A partial reference analyzing unit 11 analyzes for each executable statement whether or not there is a partial reference using the syntactical information in the program information 20, and if there is a partial reference, obtains information on how a variable is referred. Concretely speaking, a partial reference analyzing unit 11 extracts the referred range (start position and length) in a variable when part of a variable is referred in an executable statement (particularly, an assignment statement). A variable length analyzing unit 12 analyzes syntactical information or the declarative division of the program, and obtains the length of each variable (digit length or byte length, and position of a point). The variable type analyzing unit 13 analyzes syntactical information or the declarative division of the program, and obtains the types of each variable.

A partial reference analyzing unit 11, variable length analyzing unit 12 and variable type analyzing unit 13 can be realized by making a CPU execute the program in which each of the above-described processes is described.

A grammar rule information 14 includes the rule information on how to assign data in an assignment expression and how to compare data in a comparison expression, for example, whether it is left-justified or right-justified. These rules are predetermined for each program language, and are stored in, for example, a table format in the grammar rule information table 14.

FIGS. 12A and 12B are examples of the grammar rule information 14. FIGS. 12A and 12B respectively show examples of an assignment rule table in COBOL and a comparison rule table in COBOL. In FIGS. 12A and 12B, "1", "2", "3" and "X" indicate left-justify and transcribe or compare, right-justify and transcribe or compare, align decimal point and transcribe or compare, and unable to transcribe nor compare, respectively. For example, since it is decided that a "right-justify" is executed in COBOL when a referred variable with the data type of external decimal is assigned to a target variable with the data type of external decimal, in the table of FIG. 12A, "2" is already set as data corresponding to the assign process. In other words, if the data types of a referred variable and an assigned variable in an executable statement are recognized, it can be learned how the variables are transcribed (left-justified, right-justified or decimal point-aligned) by referring to the table shown in FIG. 12A or 12B. When a partial reference is defined in an assignment or comparison expression, the rule of partial reference is preferred regardless of the data types of the variables. When variables used in an assignment or comparison expression are "multiple item variables" composed of a plurality of items, the assign or compare process is "left-justified" regardless of the data types of the variables.

The explanation will again go back to FIG. 10. An internal layout analyzing unit 15 analyzes on what range inside a variable an executable statement has operated using the information obtained from the partial reference analyzing unit 11, variable length analyzing unit 12, variable type analyzing unit 13 and grammar rule information 14. A domain analyzing unit 16 categorizes variables or their internal elements by domain using the analysis result of the internal layout analyzing unit 15, and outputs the categorized information as variable categorizing information 30.

When there is a partial assignment or comparison of variable data, or an assignment or comparison between variables of different length, it can be judged by the above-described configuration whether or not the data within the range inside the variable on which an executable statement actually operates belongs to the same domain as another variable (or part of another variable). Therefore, more accurate categorization than that of the related invention can be realized by the present invention.

A shared variable extracting unit 17 extracts the variables which are shared with a plurality of variables, such as a buffer record. Generally speaking, the buffer record (document record) is used together with "BEFORE", "AFTER", "FROM", etc. in a "WRITE" executable statement in COBOL. Therefore, the buffer record can be extracted by scanning and searching a program.

Shared variable information 18 includes a table for registering the shared variables extracted by the shared variable extracting unit 17. Namely, a shared variable used in a target program is registered, being distinguishable from other variables in the program, in the shared variable information 18. The shared variable extracting unit 17 displays the shared variables registered in the shared variable information 18, and is provided with a function for making a user designate unnecessary variables. The shared variable extracting unit 17 deletes variables designated by a user from the shared variable information 18.

The domain analyzing unit 16 uses the shared variable information 18 when judging whether or not variables belong to the same domain based on the executable statement described in a program. For example, it is assumed that the executable statement in which a variable A is assigned to a shared variable S, and in which a variable B is assigned to the variable S, are analyzed. In this case, since it is inferred that both variables A and S belong to the same domain, and that both variables B and S belong to the same domain, it is inferred that the variables A and B belong to the same domain through the variable S. However, the domain analyzing unit 16 makes a user judge whether or not both variables A and B actually belong to the same domain when recognizing that the variable S is a shared variable. The domain analyzing unit 16 assigns the extracted shared variable to different domains including the variable which has assignment relations with the shared variable, and attaches a predetermined mark to the shared variable when outputting the result of the domain analysis.

Using the above-described configuration, a user's attention can be brought to categorizing variables by domain so that a shared variable may not have an effect when the shared variable is included in a target program. Variable categorizations based on the domain corresponding to both wide and narrow concepts can be made, which improves the degree of freedom of the its variable categorizing method.

Next, the detailed operation of the program analyzing apparatus of this embodiment is described below.

Figure 13:
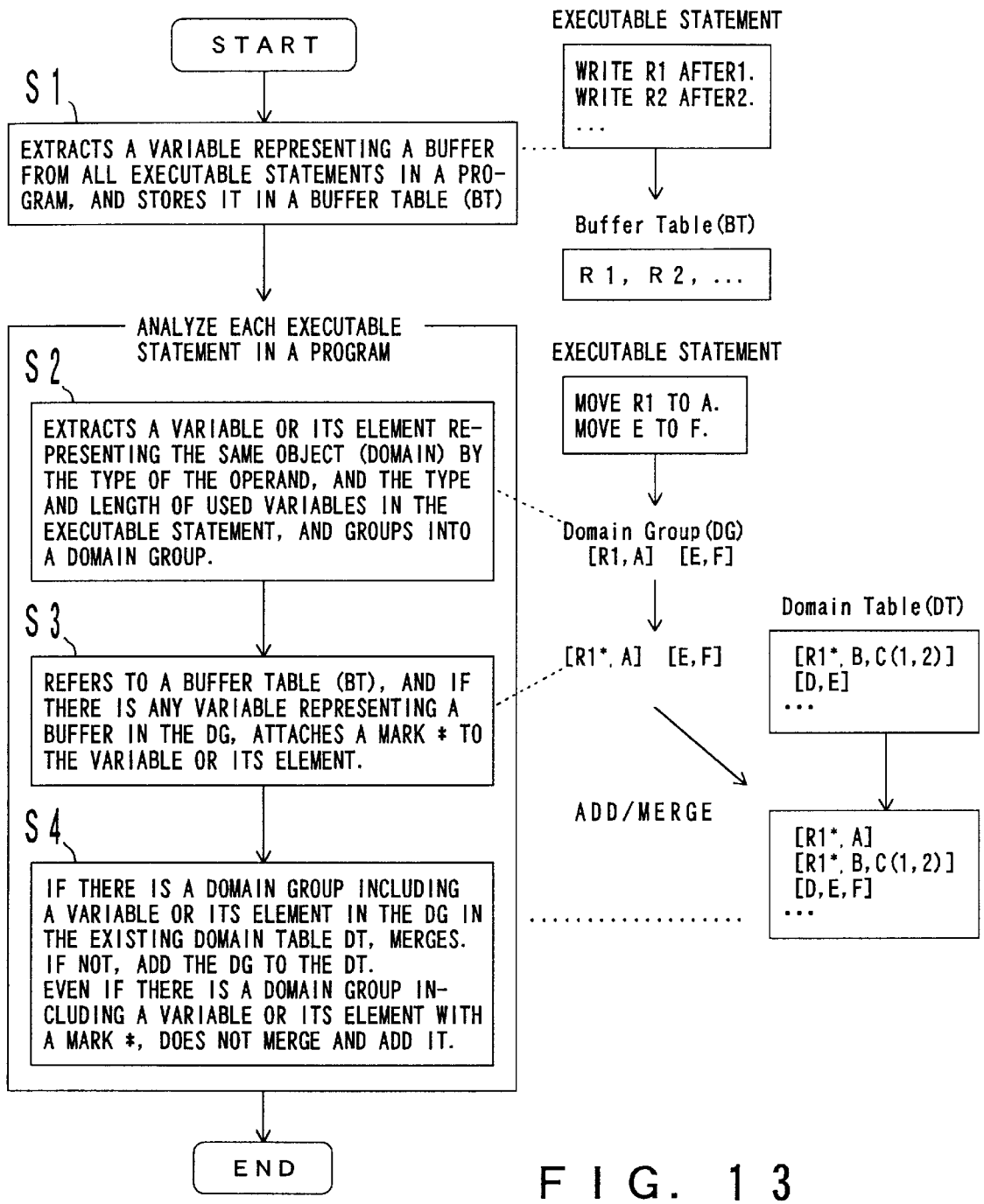
FIG. 13 is a flowchart explaining the whole operation of the program analyzing apparatus of this embodiment.

FIG. 13 is a flowchart explaining the whole operation of the program analyzing apparatus of this embodiment. This flowchart shows the process after a target program is input.

In step S1, it extracts a shared variable (variable used for a buffer) or its internal element from a target program, and registers the extracted variable or internal element in a buffer table BT. The buffer table BT corresponds to the shared variable information 18 in FIG. 10. Step S1 is executed by the shared variable extracting unit 17 in FIG. 10. In the embodiment example of FIG. 13, R1 and R2 are extracted as shared variables, and stored in the buffer table BT.

Steps S2 to S4 are executed for each executable statement of a target program. In step S2 the variable and its internal element are categorized by domain according to the type of the operand in the executable statement, and the type and length of the variable used in the executable statement. Each group resulted from the categorization shall be called a domain group DG. Step S2 is executed by the partial reference analyzing unit 11, variable length analyzing unit 12, variable type analyzing unit 13, internal layout analyzing unit 15 and domain analyzing unit 16. In the embodiment example of FIG. 13 it is judged that R1 and A belong to the same domain, and that both E and F belong to the same domain.

In step S3, an identification mark is attached to a shared variable or its internal element in the domain group DG referring to the buffer table created in step S1. In the embodiment example of FIG. 13 the identification mark (shown by * in the drawing) is attached to R1.

In step S4, each domain group is checked for whether or not there is any variable or its element belonging to the group in the domain table DT created beforehand. If there is any variable or its element belonging to a certain domain group in the domain table created beforehand, it merges the domain group and the domain in which there is a shared variable or its element. Here, "to merge" means to create a set aggregate out of a plurality of sets in which there is no plurality of the same element. Therefore, for example, when a set with an element [A] and a set with an element [A, B] are merged, a set aggregate with an element [A, B] is obtained, (a set with an element [A, A, B] is not obtained). On the other hand, unless there is any variable or its element belonging to a certain domain group in the domain table DT created beforehand, the domain group is registered in the domain table as a new domain. In the above-described judgement, a common element is excluded.

The process of step S4 is described below using an example. As shown in FIG. 13, since there is a common element E between a domain group [E, F] and a domain [D, E], it merges these to create a domain [D, E, F]. Among variables belonging to a domain group [R1, A], a variable A is not included in the domain table DT, but a variable R1 is included in the domain table DT. However, since the variable R1 is a shared variable, the domain [R1, A] and a domain [R1, B, C] cannot be merged, and the domain group [R1, A] is registered in the domain table as a new domain.

In this way, variables used in a target program are categorized by domain.

Figure 14:
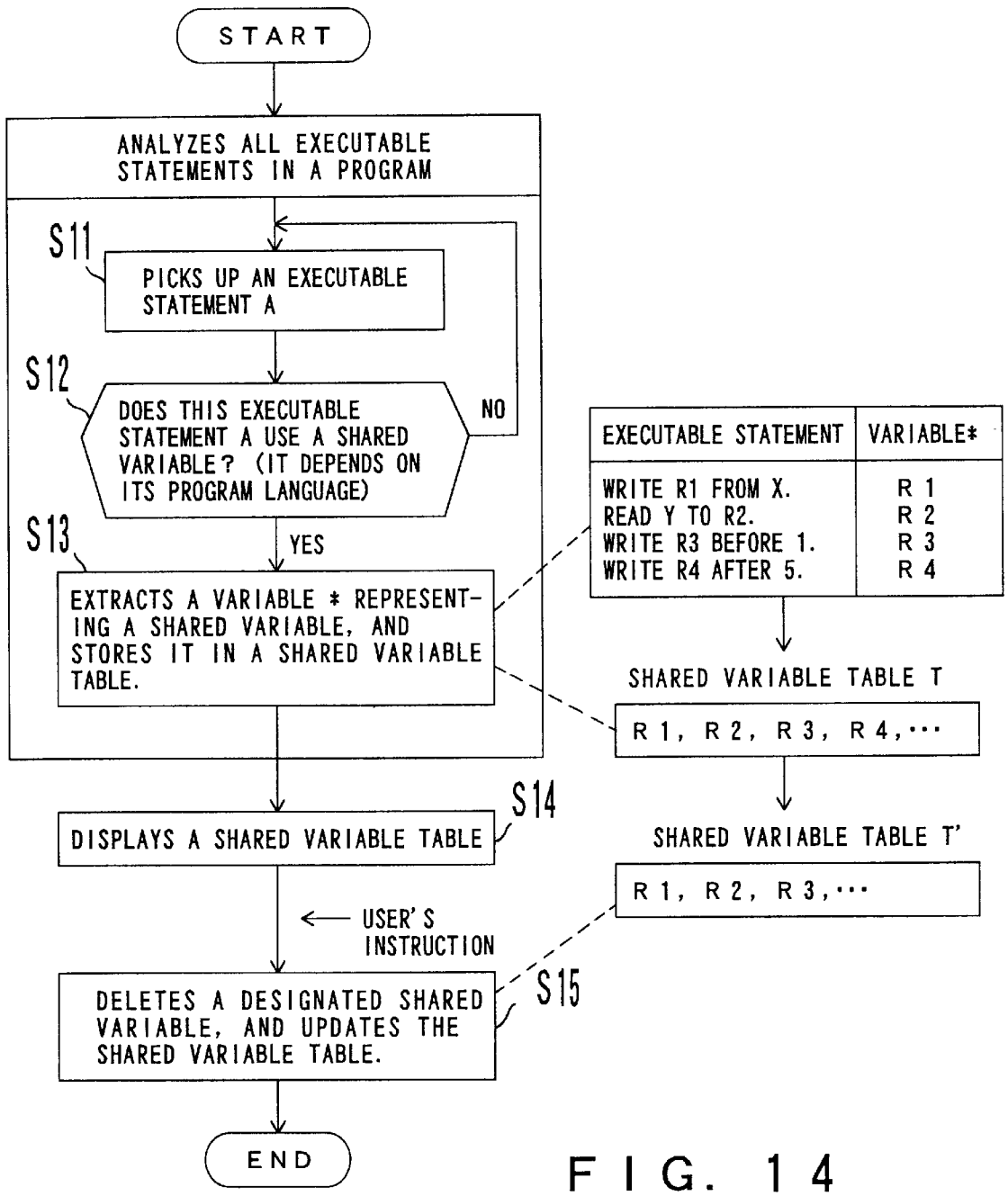
FIG. 14 is a flowchart explaining the process of the shared variable extracting unit shown in FIG. 10.

FIG. 14 is a flowchart explaining the process of the shared variable extracting unit 17 shown in FIG. 10, and corresponds to step S1 in FIG. 13.

The processes of steps S11 to S13 are executed for each executable statement described in a target program. In step S11, one executable statement is extracted from the target program. It is assumed that the extracted executable statement is an executable statement A. In step 12, it is checked whether or not the extracted executable statement is using a shared variable. This process varies depending on the program language. If a shared variable is used, the flow proceeds to step S13, and if not, it returns to step S11 and extracts a next executable statement.

In step S13, a shared variable is extracted from the executable statement, and stored in a shared variable table. For example, since in COBOL a shared variable such as a buffer record (document record) is usually used when writing data in a document, a shared variable is often included in a "WRITE" or "READ" executable statement. Therefore, when a shared variable is extracted from a program described in COBOL, the "WRITE" and "READ" executable statements can be extracted, and then the shared variable can be extracted from those executable statements. In the embodiment example of FIG. 14, shared variables R1 to R4 are extracted.

In step S14, the shared variable table T created by the steps S11 to 13 is displayed, and a user's instructions are received. The user can designate from among the displayed shared variables the variable which he or she wants to handle as a normal variable. This designation is made using an input device such as a keyboard or mouse.

In step S15, the shared variable designated by a user is deleted from the shared variable table T, and the shared variable table is updated. In the embodiment example of FIG. 14, a shared variable R4 is deleted from the shared variable table T by a user's designation.

Figure 15:
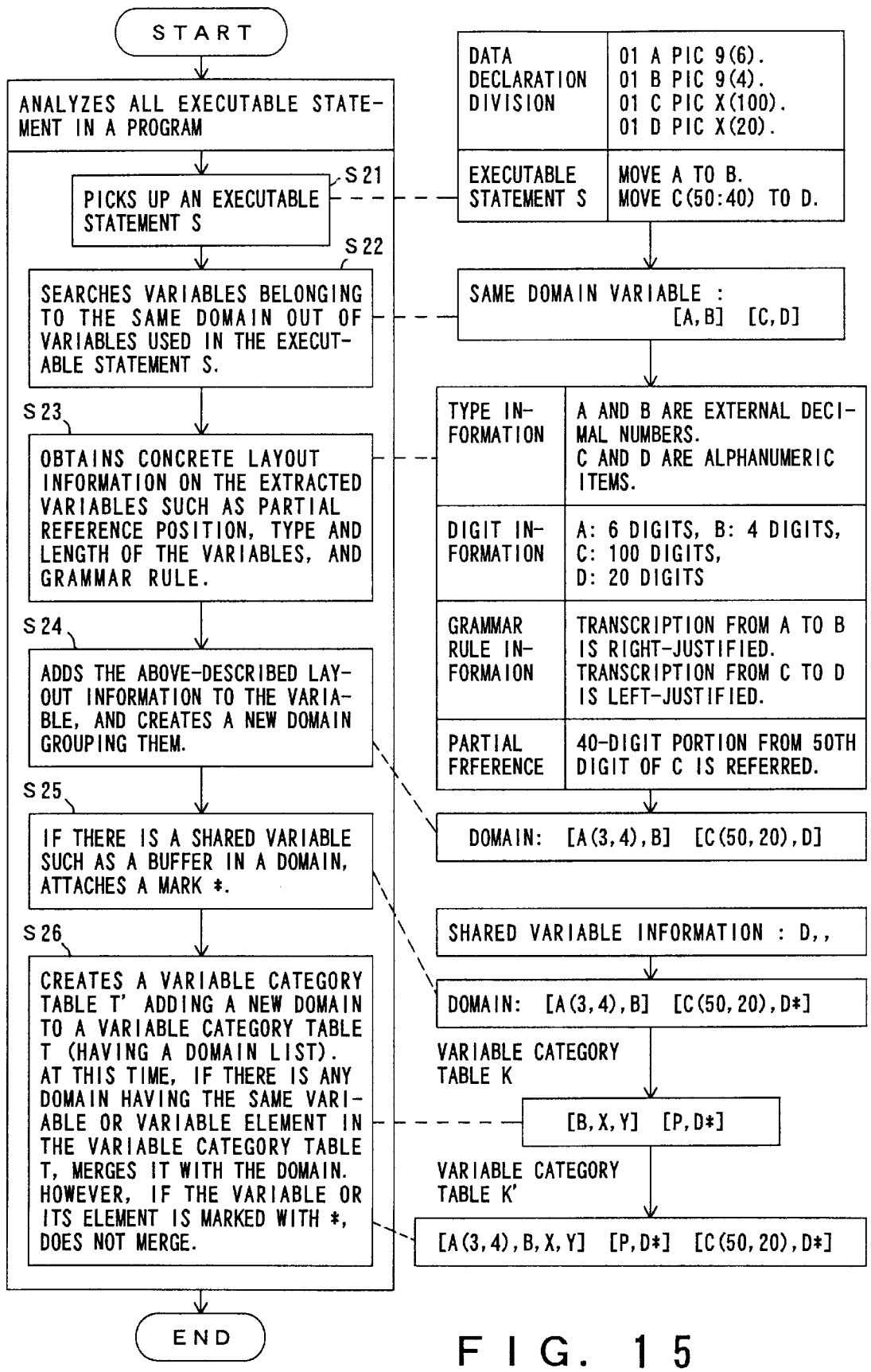
FIG. 15 is a flowchart for the domain analyzing process by the program analyzing apparatus of this embodiment.

FIG. 15 is a flowchart of the domain analyzing process using the program analyzing apparatus of this embodiment. This flowchart corresponds to steps S2 to S4 in FIG. 13.

In step S21, one executable statement is extracted from a target program. It is assumed that the extracted executable statement is an executable statement S. In step S22, variables used in the executable statement S are categorized by domain using the technology of the related invention. For example, if the executable statement S is "MOVE A TO B", it is judged that both variables A and B belong to the same domain. And if the executable statement S is "MOVE C (50:40) D", it is judged that both variables C and D belong to the same domain.

In step S23, the data type, data length, range of partial reference and grammar rule are obtained, which are defined in the executable statement S. The data type, data length and range of partial reference are detected by the variable type analyzing unit 13, variable length analyzing unit 12 and partial reference analyzing unit 11, respectively. The grammar rule can be obtained by referring to the grammar rule information 14. In the example shown in FIG. 15, for variables A to D, the information "A and B are external decimal digits" and "C and D are alphanumeric items" are obtained as the type information of the variables, "A: 6 digits, B: 4 digits" and "C: 100 digits, D: 20 digits" as the length information of the variables, "transcription from A to B is right-justified" and "transcription from C to D is left-justified" as grammar rules, and "40-digit length portion from 50th digit of C are referred" as the partial reference information, respectively. It is assumed that this information is called the internal layout information. The details of step S23 are described later.

In step S24, the internal layout information obtained in step S23 is added to the variable searched for each domain in step S22. In the embodiment of FIG. 15, domains [A (3, 4), B] and [C (50, 20), D] are obtained by step S24, where A (x, y) and symbols not parenthesized represent the range of a length y from xth digit of a variable A and the whole variable, respectively.

In step S25, a shared variable table T' created by the process of the flowchart in FIG. 14 is referred to, and if there is any variable registered in the shared variable table T' in each domain searched in step S24, it attaches an identification mark (shown by * in the drawing) to the variable. In the example of FIG. 15, a variable D is registered in the shared variable table as a shared variable, and a domain [C (50, 20), D] is updated to [C (50, 20), D*] by the process of step S25.

Step S26 is the process of the domain analyzing unit 16, and corresponds to step S4 in FIG. 13. Namely, it adds the new domain obtained by analyzing the executable statement S to a variable categorizing table K created beforehand, and outputs a variable categorizing table K'. At this time, when there is the variable or its element which is included in both of the new domain obtained by analyzing the executable statement S and the domain included in the variable categorizing table K created beforehand, and when their layout information coincide with each other, these two domains are merged. As described above, when the variable or its element is a shared variable, it does not merge them.

For example, it is assumed that there are two domains [B, X, Y] and [P, D*] in a variable categorizing table K obtained beforehand. At this time, if a domain [A (3, 4), B] is obtained by analyzing an executable statement S, domains [B , X, Y]

and [A (3, 4), B] are merged to create a domain [A (3, 4), B, X, Y], since there is a variable B in the two domains, and their layout information on the variable B coincide with each other (both are undefined). On the other hand, if a domain [C (50, 20), D] is obtained by analyzing the executable statement S, domains [C (50,20), D] and [P, D] are not merged, and the domain [C (50, 20), D] is added to the variable categorizing table K as a new domain since a variable D is a shared variable, though there is the variable D in the two domains.

FIG. 16A is an example of the display of the analysis result obtained by the process of the flowchart in FIG. 15. In the embodiment example of FIG. 15, three domains have been obtained. In FIG. 16A these domains are displayed as D1 to D3. A shared variable is displayed in a status distinguishable from a normal variable. Accordingly, in this embodiment, even when both variables P and C belong to the same domain as a variable D, it is not judged that both variables P and C belong to the same domain, if the variable D is a shared variable. Namely, in this embodiment, a plurality of variables are prevented from being connected with each other through a shared variable.

As described with reference to FIG. 14, the user can designate to handle the variable extracted from the program as a shared variable as a normal variable. For example, in the example of FIG. 15, although the variable D is handled as a shared variable, domains [C (50, 20), D] and [P, D] are merged, if the user designates handling this variable D as a normal variable. If the shared variable D has been designated as a normal variable, then these two domains are merged, and the analysis result as shown FIG. 16B is displayed. In this case, it is displayed that both variables P and C belong to the same domain. In this way, in this embodiment, a domain range can be easily modified by a user's designation.

FIG. 17 is a flowchart explaining the process for analyzing the internal layout of a variable. This flowchart corresponds to step S23 in FIG. 15. This flowchart is executed for each assignment or comparison expression described in a target program. In the following, a referred variable and an assigned variable in an assignment expression are described as "A" and "B", respectively. In the case of a comparison expression, for example, variables on the right and left are described as "A" and "B".

The explanation is made below taking an example for analyzing an assignment expression [MOVE ID (3:4) TO YMD], where it is assumed that variables ID and YMD are an external decimal digit of 10 bytes and an alphanumeric of 6 bytes, respectively. Information on these variables can be extracted from the data declarative division of a target program, and is held as syntax information of the program information 20.

In step S31, first it extracts a variable used in an executable statement is extracted. Here, both variables ID and YMD are extracted. Then, the program information 20 is referred to, and the data type of those variables is searched. Here, it is recognized that variables ID and YMD are an external decimal digit and an alphanumeric, respectively. Step 31 is executed by the variable type analyzing unit 13.

In step S32, the program information 20 is referred to, and the length of each variable is calculated. For the variable in which the decimal point position is declared, the length of integer part and decimal part is calculated. Here, it is assumed that the length of the variable A is al, the length of the decimal part of the variable A is adl (when there is no decimal part, adl=0), and the length of the integer part of the variable A is ail (when there is no decimal part, ail=al), respectively, and it is also assumed that the length of the variable B is bl, the length of the decimal part of the variable B is bdl (when there is no decimal part, bdl=0), the length of the integer part of the variable B is bil (when there is no decimal part, bil=bl), and "al=10, adl=0, ail=10, bl=6, bdl=0, bil=6" can be obtained. Step S32 is executed by the variable length analyzing unit 12.

In step S33, the extracted assignment or comparison expression is analyzed, whether or not there is any partial reference for the variables A and B is checked and if there is a partial reference, its range is calculated. Here, it is assumed that the partial reference start position of the variable A is arf (no partial reference=1), the partial reference length of the variable A is arl (when there is no partial reference, arl=al), the partial reference start position of the variable B is brf (no partial reference=1), and the partial reference length of the variable B is brl (when there is no partial reference, brl=bl), respectively, and "arf=3, arl=4, brf=1, brl=6" can be obtained. Step S33 is executed by the partial reference analyzing unit 11.

In step S34, the grammar rule information 14 shown in FIGS. 12A and 12B is referred to based on the data types of the variables A and B, and class information @ is obtained. Here, since the executable statement is an assignment expression, it refers to the table in FIG. 12A. Although variables A and B are an external decimal digit and an alphanumeric respectively, for the variable A it searches the table as a "partial reference" instead of an "external decimal digit", since the variable A is partially referred. As its search result, "class information @=1: left-justify" can be obtained.

In step S35, whether or not the combination between the variables A and B is the combination in which they can be assigned or compared is checked. Although it varies depending on the program language, generally speaking, the case where a certain variable cannot be assigned to another variable with a different data type and the case where variables with different data types cannot be compared with each other, are defined. In COBOL the combinations which are marked with "x" in the tables of FIGS. 12A and 12B are prohibited. In step S35, whether or not the combination between the variables A and B is such a prohibited combination is checked as described above. If they can be assigned or compared, flow proceeds to step S36, and if not, the process is terminated.

In step S36, whether or not the class information @ of the assignment or comparison is left-justified is judged, and if the class information @ is left-justified, flow proceeds to step S37. If not, it proceeds to step S40.

In step S37, the length of the range which is actually referred in each variable is compared. Namely, arl is compared with brl. If arl≦brl, flow proceeds to step S38, and if arl>brl, it proceeds to step S39.

In step S38, the layout information in the case where the class information @ is "left-justified", and where a referred variable (or part of a referred variable) is shorter than or equal to an assigned variable (or part of an assigned variable) is calculated. If the layout information is expressed as "variable (start position, length)", "A (arf, arl), B (brf, arl)" can be obtained as the layout information of each variable. In the embodiment example "ID (3, 4), YMD (1, 4)" can be obtained. In this way, in the case of "left-justify", the start position of the range actually referred to of each variable coincides with its partial reference start position. When a referred variable is shorter than or equal to the length of an assigned variable, the length of the range actually referred to of each variable is matched with the length of the referred variable.

In step S39, the layout information in the case where the class information @ is "left-justified", and where a referred variable (or part of a referred variable) is longer than an assigned variable (or part of an assigned variable) is calculated. In this case the layout information becomes "A (arf, brl), B (brf, brl)". Namely, when a referred variable is longer than an assigned variable, the length of the range actually referred to of each variable is matched with the length of the assigned variable.

Figure 18:
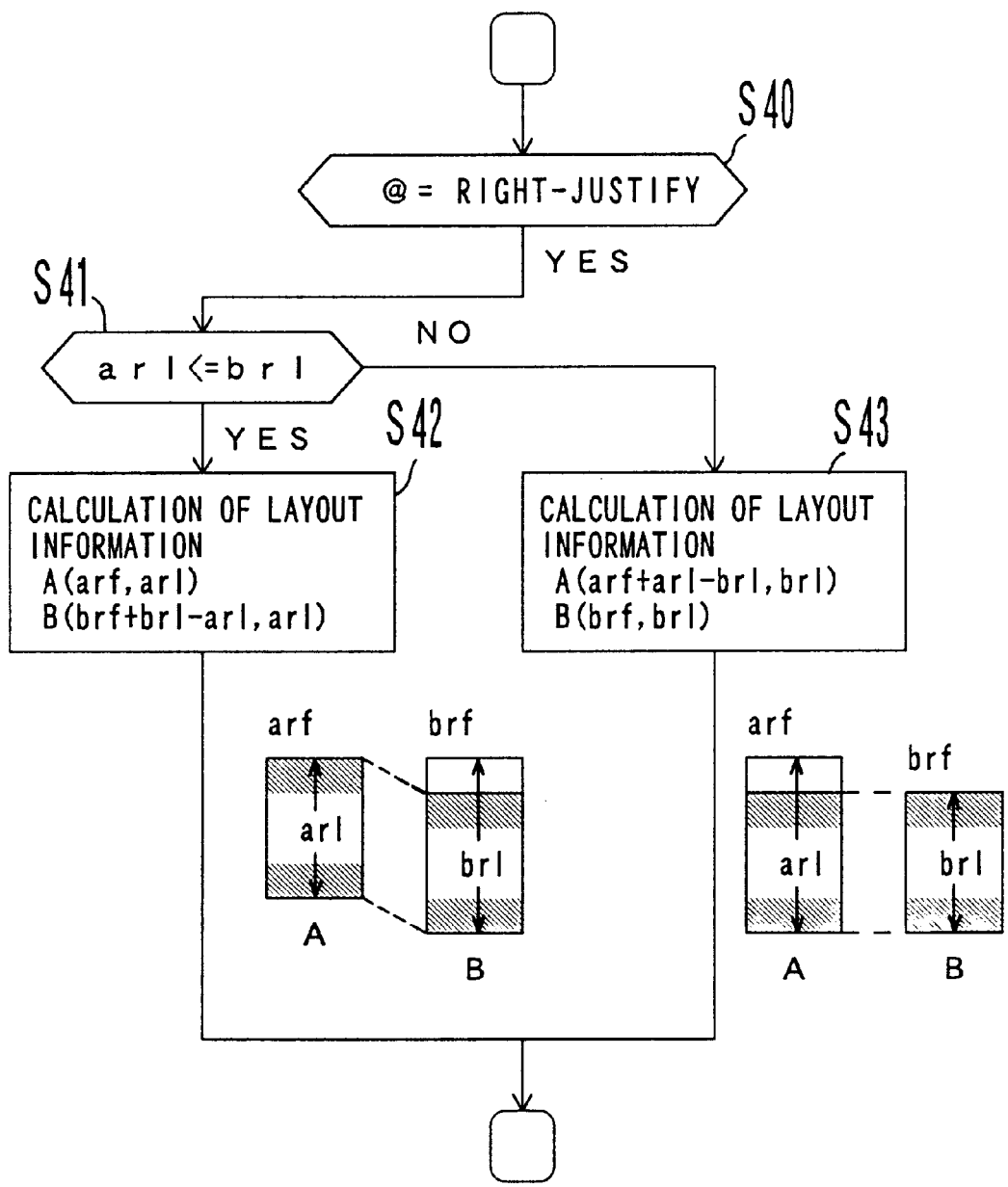
FIG. 18 is a flowchart showing the process of calculating the layout information(process 1).

In step S40, the class information @ is referred to, and if it is "right-justified", the process shown in FIG. 18 (process 1) is executed. If it is "aligned by decimal point", the process shown in FIG. 19 (process 2) is executed.

FIG. 18 is the flowchart of the process for calculating the layout information. If it is judged in step S40 that class information @=right-justify, the processes after step S41 are executed.

In step S41, the length of the range actually referred to in each variable is compared in the same way as in step S37. If arl≦brl, flow proceeds to step S42, and if arl>brl, it proceeds to step S43.

In step S42, the layout information in the case where it is right-justified, and where an assigned variable is longer than or equal to a referred variable, is calculated. In this case, the layout information becomes "A (arf, arl), B (brf+brl−arl, arl)".

In step S43, the layout information in the case where it is right-justified, and where a referred variable is longer than an assigned variable is calculated. In this case, the layout information becomes "A (arf+arl−brl, brl), B (brf, brl)".

Accordingly, when it is "right-justified", the start position of the range actually referred to of a longer variable is moved by the difference in length actually referred to between those two variables.

Figure 19:
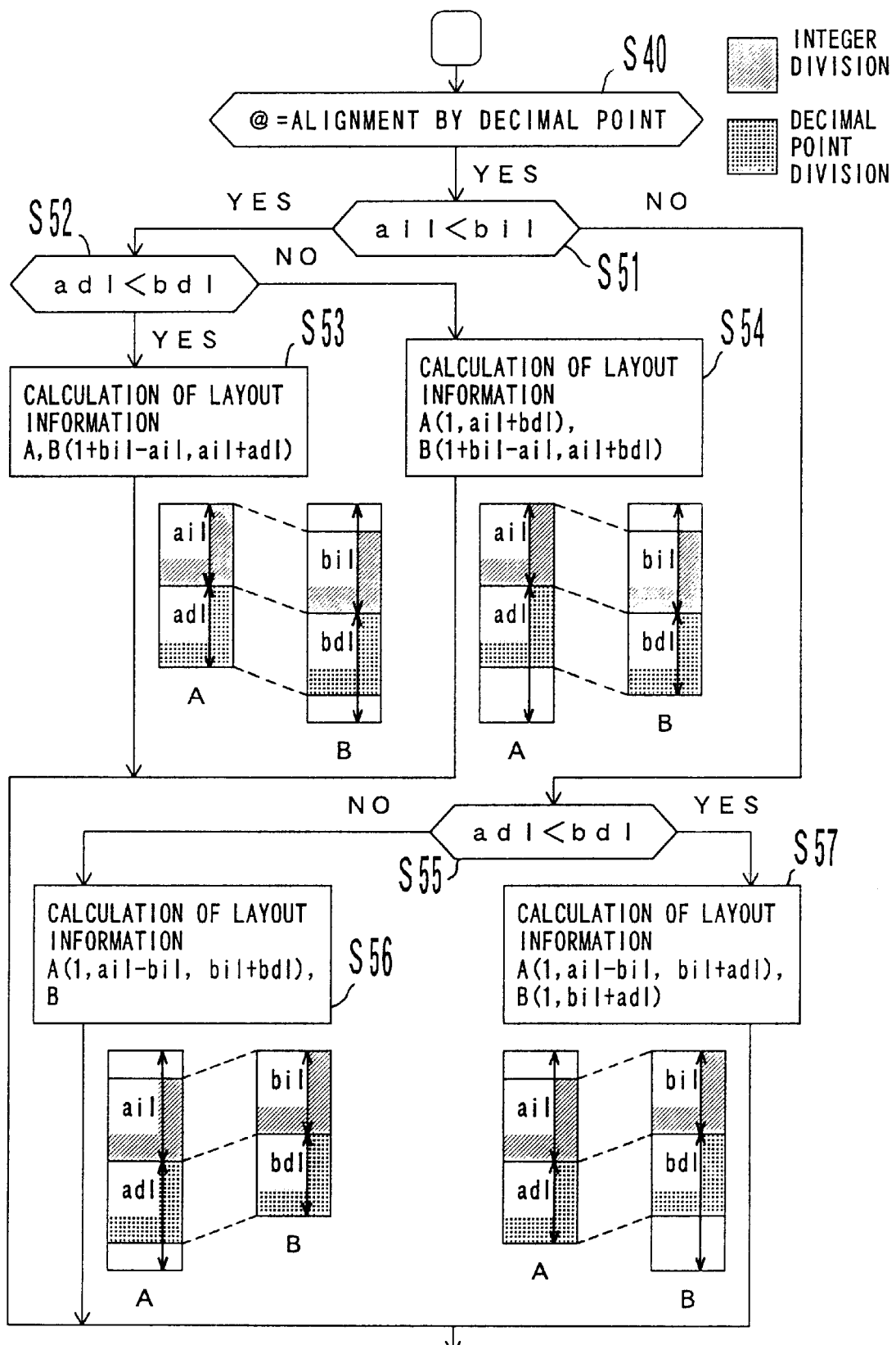
FIG. 19 is a flowchart showing the process of calculating the layout information(process 2).

FIG. 19 is the flowchart of the process for calculating the layout information. If it is judged in step S40 that class information @=alignment by decimal point, the processes after step S51 are executed. Since the processes of the flowchart in FIG. 19 is basically the same as those explained in FIGS. 17 and 18, its description is made briefly.

In step S51, it is judged if ail<bil. If ail<bil, flow proceeds to step S52, and if not, it proceeds to step S55.

In step S52, it is judged if adl<bil. If adl<bdl, flow proceeds to step S53, and if not, it proceeds to step S54.

In steps S53 and S54, the layout information is calculated. The layout information obtained by step S53 becomes "A (1, ail+adl), B (1+bil−ail, ail+adl)". On the other hand, the layout information obtained by step S54 becomes "A (1, ail+bdl), B (1+bil−ail, ail+bdl)".

In step S55, it is judged if adl<bdl. If adl<bdl, flow proceeds to step S57, and if not, it proceeds to step S56.

In steps S56 and S57, the layout information is calculated. The layout information obtained by step S56 becomes "A (1+ail−bil, bil+bdl), B (1, bil+bdl)". On the other hand, the layout information obtained by step S57 becomes "A (1+ail+bil, bil+adl), B (1, bil+adl)".

Next, an example of the analyzing method using the program analyzing apparatus of this embodiment is described compared with that of the related invention.

FIGS. 20 to 22 are examples of a target program. An input program in COBOL is used here. FIG. 23A is a diagram showing the result of the case where the programs shown in FIGS. 20 to 22 are analyzed using the method of the related invention, and FIG. 23B is a diagram showing the result of the case where the programs shown in FIGS. 20 to 22 are analyzed using the method of this embodiment.

First, attention is paid to a "print area". The "print area", for example, is used in the 53rd and 92nd lines. By analyzing an executable statement in the 53rd line it is judged that the "print area" and an "order entry record" both belong to the same domain, and by analyzing an executable statement in the 92nd line it is judged that the "print area" and a "stock master record" both belong to the same domain.

When the two analysis results described above are obtained by the related invention, it is judged that the "order entry record" and the "stock master record" both belong to the same domain.

On the other hand, the method of this embodiment has a function for detecting a variable (shared variable) used as a buffer record. The "print area" is a buffer record. This can be inferred, for example, from a "WRITE" executable statement in the 54th line, even if it is not designated when writing a program. Accordingly, when a "print area" is a buffer record, as explained in FIGS. 13 and 15, it does not judge that the "order entry record" and the "stock master record" both belong to the same domain, even when it is judged that the "print area" and the "order entry record" both belong to the same domain, and that the "print area" and the "stock master record" both belong to the same domain.

In the analysis result by the method of this embodiment, as shown in FIG. 23B, the "print area" is outputted with a mark * attached showing that it is a shared variable. By this it is known that the order entry, order master and stock master record have a common relation with the print area.

Then, attention is paid to a "numeric area". The "numeric area", for example, is used in the 69th and 71st lines. By analyzing the executable statement in the 69th line, it is judged that a "numeric area" and an "order No. E" belong to the same domain, and by analyzing the executable statement in the 71st line, it is judged that the "numeric area" and "ordered date E" both belong to the same domain.

In the method of the related invention, when the two analysis results described above are obtained, it is judged that the "order No. E" and the "ordered date E" both belong to the same domain.

On the other hand, in the method of this embodiment, when part of a variable is referred to, or when data is assigned to part of a variable, it has a function for categorizing variables taking the range into consideration. In the program of the embodiment example, in the executable statement of the 71st line, partial reference is not designated, but in the executable statement of the 69th line, only data in the 3rd to 12th byte of the "numeric area" are referred to. Namely, it is inferred that although data of the "numeric area" is assigned to both "order No. E" and "ordered date E", data with different ranges in the "numeric area" are assigned to both "order No. E" and "ordered date E". Therefore, even when it is judged that the "numeric area" and "order No. E" both belong to the same domain, and that the "numeric area" and "ordered date E" both belong to the same domain, it does not judge that the "order No. E" and "ordered date E" both belong to the same domain.

For a simpler judging method the length and type of each variable may be referred to. For example, since the length of "order No. E" and "ordered date E" are "10" and "8" respectively in the above-described example, and they are different in length, it is judged that these two variables do not belong to the same domain. Further, since the data types of the "order No. E" and "ordered date E" are an "external decimal digit" and "alphanumeric" respectively, and they are different in type, it is judged that these two variables do not belong to the same domain. However, the analysis accuracy of these methods is not high.

In the analysis result shown in FIG. 23B, an "ordered quantity EM" and "ordered quantity E" both belong to the same domain, and it is known from this embodiment that these variables are part of "unallotted stock quantity SM" and "allotted stock quantity SM".

The program analyzing apparatus 10 of this embodiment can be realized by executing the program in which the above-described processes of each flowchart are described, for example, in a data processing device such as a personal computer or work station. FIG. 24 is the block diagram of the data process device for realizing the program analyzing apparatus 10 in FIG. 10.

A data processing device 500 shown in FIG. 24 comprises a CPU 501, memory 502, hard disk 503, drive unit 504 and network connecting unit 505, and they are connected with each other by a bus 506. The data processing device 500 loads programs corresponding to a partial reference analyzing unit 11, variable length analyzing unit 12, variable type analyzing unit 13, internal layout analyzing unit 15, domain analyzing unit 16 and shared variable extracting unit 17 into the memory 502, and executes them using the CPU 501. The programs corresponding to each of the above-described units are provided in one of the following manners.

(1) They are stored on the hard disk 503.
(2) They are supplied through the drive device 504 from a portable storage medium.
(3) They are down-loaded from a server on a network through the network connecting device 505.

The portable storage medium are, for example, a magnetic disk such as a floppy disk, etc., an optical disk such as a CD-ROM, etc., or an opto-magnetic disk, etc.

As described above, in the present invention, when an executable statement in which part of a variable is referred to or in which data is assigned to part of a variable, are described, it categorizes a variable or its element by domain taking its range into consideration. Therefore, its analysis accuracy is improved compared with the prior art.

Since the present invention takes into consideration whether or not the variable is a variable to be used as a buffer when analyzing a variable, variables unrelated to each other are prevented from being judged that they belong to the same domain.

Since a variable used as a buffer can be also handled as a normal variable by a user's instruction, the present invention can also categorize the variable from various viewpoints by changing the range of a domain.

Generally speaking, if variables having a specific concept can be extracted from a program, this is convenient for understanding and debugging the program. Therefore, in the present invention it is expected that the work efficiency of program correction and modification is improved.

What is claimed is:

1. A program analyzing apparatus for analyzing a program and outputting the analysis result of the variables used in the program, comprising:

extracting means for extracting an assignment expression including a plurality of variables from the program:

detecting means for detecting at least one of a range of data which is to be referred by the assignment expression and a range to which data is to be assigned by the assignment expression; and categorizing means for categorizing the plurality of variables according to the range detected by said detecting means.

2. The program analyzing apparatus according to claim 1, wherein said detecting means detects the range based on the length of each of the plurality of variables, the data type of each of the plurality of variables and the partial reference information on the plurality of variables.

3. The program analyzing apparatus according to claim 2, further comprising:

storing means for storing grammar rule information in which the assigned position of a variable is specified according to the data types of a referred variable and an assigned variable when a certain variable is assigned to another variable, wherein said detecting means detects the range using the grammar rule information stored in said storing means.

4. A program analyzing apparatus for analyzing a program and outputting the analysis result of the variables used in the program, comprising:

extracting means for extracting a comparison expression for comparing two variables from the program;

detecting means for detecting the range of data which is to be referred by the comparison expression for at least one of the two variables; and categorizing means for categorizing the variables according to the range detected by said detecting means.

5. A program analyzing apparatus for analyzing the relation among variables by the type of an executable statement or the type of operand when a plurality of variables are used in an executable statement in a program, comprising:

detecting means for detecting the length of each of the plurality of variables, data type of each of the plurality of variables, and each range to be referred or assigned by the executable statement for the plurality of variables; and judging means for judging whether or not the plurality of variables belong to the same domain using the detection result of said detecting means.

6. A program analyzing method for analyzing a program and outputting information on the variables used in the program, comprising the steps of:

extracting an executable statement including a plurality of variables from the program;

detecting at least one of a range of data which is to be referred by the executable statement and a range to which data is to be assigned by the executable statement for at least one of the plurality of variables; and categorizing the plurality of variables according to the detected range.

7. A computer readable memory medium storing a program for making a computer perform a method comprising:

extracting an executable statement including a plurality of variables from a target program;

detecting at least one of a range of data to be referred by the executable statement and a range to which data is assigned by the executable statement for at least one of the variables; and categorizing the variable according to the detected range.

8. A program analyzing apparatus for analyzing the relation among variables by the type of an executable statement or the type of operand when a plurality of variables are used in an executable statement in a program, comprising:

extracting means for extracting a variable to be used as a buffer from the variables used in the program; and judging means, when there is an assignment or comparison relation between a first variable and a second variable, and when there is also an assignment or comparison relation between the first variable and a third variable, for judging the second and third variables belong to the same domain, unless the first variable is to be used as a buffer, and not for judging the second and third variables belong to the same domain, if the first variable is to be used as a buffer.

9. The program analyzing apparatus according to claim 8, wherein said judging means makes the first variable belong to both of the domains, each corresponding to the second and third variables, and displays the analysis result so as to discriminate the first variable from other variables, when the first variable has been used as a buffer.

10. The program analyzing apparatus according to claim 9, wherein said extracting means displays the extracted variables in order to make a user select his or her desired variable out of the extracted variables, and deletes the selected variable from its extraction result, when the certain variable is selected by a user.

11. A program analyzing method for analyzing the relation among variables by the type of an executable statement or the type of operand when a plurality of variables are used in the executable statement in a program, comprising the steps of:

extracting a variable to be used as a buffer from the variables used in said program; and judging, when there is an assignment or comparison relation between a first variable and a second variable, and when there is also an assignment or comparison relation between the first variable and a third variable, whether or not the second and third variables belong to the same domain based on whether or not the first variable is to be used as a buffer.

12. A computer readable memory medium storing a program for making a computer perform a method comprising:

extracting a variable to be used as a buffer from variables used in a target program; and determining, when there is one of an assignment and a comparison relation between a first variable and a second variable, and when there is also one of an assignment and a comparison relation between the first variable and a third variable, whether the second and third variables belong to one domain based on whether the first variable is to be used as a buffer.

\* \* \* \* \*